(12) United States Patent
Abraham et al.

(10) Patent No.: US 9,740,994 B2
(45) Date of Patent: Aug. 22, 2017

(54) SIMULATION OF SUPPLY CHAIN PLANS USING DATA MODEL

(75) Inventors: Manoj Abraham, Foster City, CA (US); Qun Chen, Jackson Heights, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 792 days.

(21) Appl. No.: 12/751,509

(22) Filed: Mar. 31, 2010

(65) Prior Publication Data

US 2011/0246250 A1 Oct. 6, 2011

(51) Int. Cl.
G06Q 10/00 (2012.01)
G06Q 10/06 (2012.01)

(52) U.S. Cl.
CPC ......... *G06Q 10/06* (2013.01); *G06Q 10/0631* (2013.01); *G06Q 10/06316* (2013.01)

(58) Field of Classification Search
CPC .................................................. G06Q 10/0631
USPC .............................................. 705/7.12, 7.26
See application file for complete search history.

(56) References Cited

U.S. PATENT DOCUMENTS

| | | | |
|---|---|---|---|
| 5,303,146 A * | 4/1994 | Ammirato et al. ........... | 715/204 |
| 6,105,030 A | 8/2000 | Syed et al. | |
| 6,334,146 B1 | 12/2001 | Parasnis et al. | |
| 6,810,429 B1 | 10/2004 | Walsh et al. | |
| 7,590,987 B2 | 9/2009 | Behrendt et al. | |
| 2002/0032492 A1 | 3/2002 | Sohner et al. | |
| 2003/0195934 A1 | 10/2003 | Peterson et al. | |
| 2004/0068419 A1 * | 4/2004 | Salwitz et al. ..................... | 705/1 |
| 2004/0111304 A1 | 6/2004 | Meka et al. | |
| 2004/0267836 A1 * | 12/2004 | Armangau et al. ........... | 707/203 |
| 2005/0057560 A1 | 3/2005 | Bibr et al. | |
| 2006/0143225 A1 | 6/2006 | Brendle et al. | |
| 2006/0288046 A1 * | 12/2006 | Gupta et al. .................. | 707/200 |
| 2007/0143131 A1 | 6/2007 | Kasper et al. | |
| 2007/0208608 A1 * | 9/2007 | Amerasinghe et al. ........ | 705/10 |
| 2007/0239774 A1 | 10/2007 | Bodily et al. | |

(Continued)

OTHER PUBLICATIONS

Manoj Abraham, et al., U.S. Appl. No. 12/751,535, filed Mar. 31, 2010.

(Continued)

*Primary Examiner* — Susanna M Meinecke Diaz
(74) *Attorney, Agent, or Firm* — Miles & Stockbridge P.C.

(57) ABSTRACT

A new computer-readable medium, computer-implemented method, and system is provided which can allow a user to make changes to the planning data, generate a new plan, generate a new solution based on the generated plan, or perform an alternative scenario analysis on the generated plan. In one embodiment, a new model for representing planning data, identified as a "base-plus-delta" model is provided. In another embodiment, a new web service implementation for a planning engine is provided. In another embodiment, a new technique for copying plans to perform an alternative scenario analysis on the copied plan is provided. In another embodiment, an automatic propagation of user changes from a database directly to an in-memory object is provided. In certain embodiments of the invention, two or more of the described features can be combined to provide an interactive supply chain planning system.

13 Claims, 21 Drawing Sheets

| | Identity | Name | Value | Plan Id | New Plan Id | New Plan List | Applied | |
|---|---|---|---|---|---|---|---|---|
| Resource Table 810 | 101 | Resource1 | Value1 | 1 | -1 | 2,3 | 1 | ---Base Plan 1 |
| | 102 | Resource2 | Value2 | 1 | -1 | 2,3 | | ---Base Plan 1 |
| | 103 | Resource3 | Value3 | 1 | 2 | | | ---Delta Plan 2 |
| | 104 | Resource1 | Value4 | 1 | 3 | | | ---Delta Plan 3 |

| | Identity | Name | Value | Plan Id | New Plan Id | New Plan List | Applied | |
|---|---|---|---|---|---|---|---|---|
| BoM Component Table 820 | 101 | Component1 | Value1 | 1 | -1 | 2,3 | 1 | ---Base Plan 1 |
| | 102 | Component2 | Value2 | 1 | -1 | 2,3 | | ---Base Plan 1 |
| | 103 | Component3 | Value3 | 1 | 2 | | | ---Delta Plan 2 |
| | 104 | Component1 | Value4 | 1 | 3 | | | ---Delta Plan 3 |

| | Identity | Name | Value | Plan Id | New Plan Id | New Plan List | Applied | |
|---|---|---|---|---|---|---|---|---|
| Routing Table 830 | 101 | Routing1 | Value1 | 1 | -1 | 2,3 | 1 | ---Base Plan 1 |
| | 102 | Routing2 | Value2 | 1 | -1 | 2,3 | | ---Base Plan 1 |
| | 103 | Routing3 | Value3 | 1 | 2 | | | ---Delta Plan 2 |
| | 104 | Routing1 | Value4 | 1 | 3 | | | ---Delta Plan 3 |

| | Identity | Name | Value | Plan Id | New Plan Id | New Plan List | Applied | |
|---|---|---|---|---|---|---|---|---|
| Demand Table 840 | 101 | Demand1 | Value1 | 1 | -1 | 2,3 | 1 | ---Base Plan 1 |
| | 102 | Demand2 | Value2 | 1 | -1 | 2,3 | | ---Base Plan 1 |
| | 103 | Demand3 | Value3 | 1 | 2 | | | ---Delta Plan 2 |
| | 104 | Demand1 | Value4 | 1 | 3 | | | ---Delta Plan 3 |

(56) References Cited

U.S. PATENT DOCUMENTS

| | | |
|---|---|---|
| 2008/0313649 A1 | 12/2008 | Tian |
| 2009/0249358 A1 | 10/2009 | Schuette |
| 2010/0121683 A1* | 5/2010 | Moorkanat et al. ............ 705/10 |
| 2010/0241670 A1* | 9/2010 | Justice et al. ................. 707/803 |
| 2010/0319002 A1 | 12/2010 | Gosain et al. |
| 2011/0029341 A1* | 2/2011 | Muse et al. ...................... 705/7 |
| 2011/0173034 A1 | 7/2011 | Riepshoff et al. |
| 2011/0173294 A1 | 7/2011 | Jackson |

OTHER PUBLICATIONS

Sam Bansal, "Theory and Practice of Advanced Planner and Optimizer in Supply Chain Domain", 2003 Winter Simulation Conference, pp. 1424-1432, http://delivery.acm.org/10.1145/1040000/1031011/p1424-bansal.pdf?key1=1031011&key2=3875026521&coll=Portal&dl=GUIDE&CFID=59024853&CFTOKEN=54595469.

Jin Dong, et al., "IBM-Smartscor—A Scor Based Supply Chain Transformation Platform Through Simulation and Optimization Techniques", 2006 Winter Simulation Conference, pp. 650-659, http://delivery.acm.org/10.1145/1220000/1218234/p650-dong.pdf?key1=1218234&key2=4165026521&coll=Portal&dl=GUIDE&CFID=59024853&CFTOKEN=54595469.

G. Caputo, et al., Optimization of Production Plan through Simulation Techniques, WSEAS Transactions on Information Sceince and Applications, Issue 3, vol. 6, Mar. 2009, pp. 352-362, http://www.wseas.us/e-library/transactions/information/2009/28-428.pdf.

Larry Lapide, Supply Chain Planning Optimization, Just the Facts, http://www.e-optimization.com/resources/amr/9805scsreport/9805scsstory1.htm.

Sanjay Jain, "Tradeoffs in Building a Generic Supply Chain Simulation Capability", 2008 Winter Simulation Conference, pp. 1873-1881, http://www.informs-sim.org/wsc08papers/231.pdf.

Caroline Thierry, et al., Supply Chain Management Simulation: An Overview, http://www.iste.co.uk/data/doc_uiimknzablyk.pdf.

Oracle, "Oracle Value Chain Planning", pp. 1-7, http://www.oracle.com/applications/planning/ds_advanced_scp.pdf.

"Web Services for Production Planning and Optimization," by Xueqing Tang, Malcolm Knox, and Jose Martinez, IEEE, ACM, INFORMS, 2006.

"Using Web-Services to Support Collaboration Practices Along the Supply Chain", by Sotiris Michalakos et al.; Department of Management Science and Technology, Athens University of Economics and Business; Proceedings of the International Conference on Next Generation Web Services Practices, 2005.

Ramakrishna Govindu, "Multi-Agent Systems for Supply Chain Modeling: Methodological Frameworks", Wayne State University, Detroit, Michigan, 2006.

Jong Myoung Ko et al., "Quality-of-service oriented web service composition algorithm and planning architecture", Department of Information and Industrial Engineering, Yonsei University, Seoul, 120-749, Korea. The Journal of Systems and Software 81 (2008) 2079-2090.

Hartmut Stadtler, "Supply chain management and advanced planning—basics, overview and challenges", European Journal of Operational Research 163, 2005, pp. 575-588.

Jinghai Rao et al., "Application of Linear Logic to Web Service Composition", In Proceedings of the 1st International Conference on Web Services, Jun. 2003.

Sanjay Ghemawat, "The Modified Object Buffer: A Storage Management Technique for Object-Oriented Databases", Department of Electrical Engineering and Computer Science, Massachusetts Institute of Technology, Sep. 1995.

Frederic Pluquet et al., "Executing Code in the Past: Efficient In-Memory Object Graph Versioning", OOPSLA 2009, Oct. 25-29, 2009, Orlando, Florida, USA.

\* cited by examiner

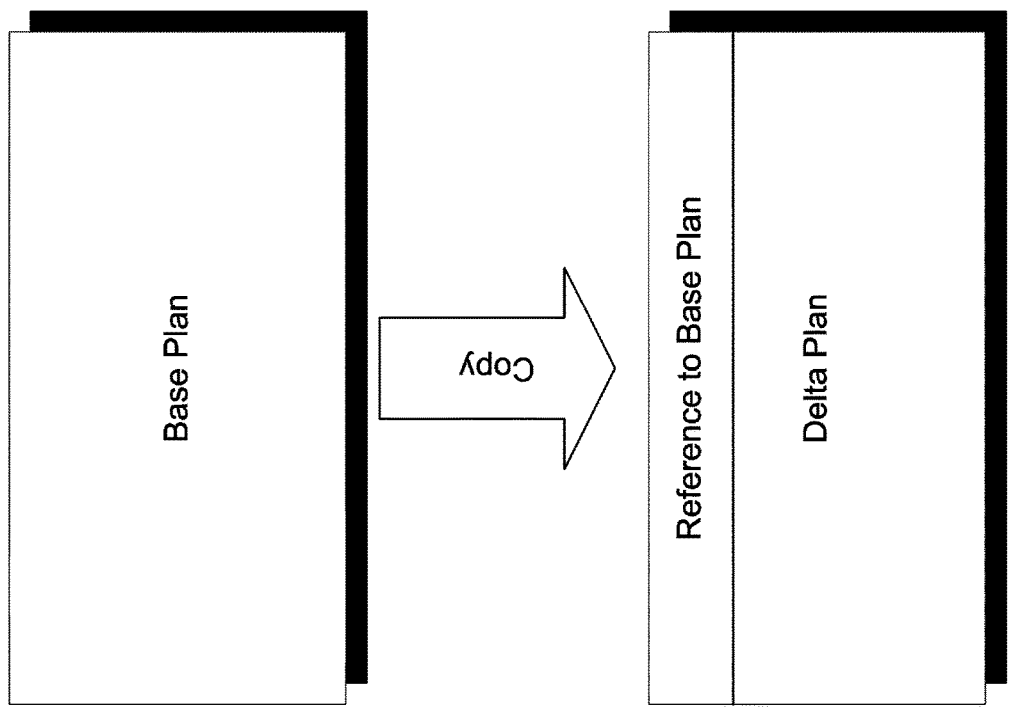

Resource Table 810

| Identity | Name | Value | Plan Id | New Plan Id | New Plan List | Applied |
|---|---|---|---|---|---|---|
| 101 | Resource1 | Value1 | 1 | -1 | 2,3 | 1 |
| 102 | Resource2 | Value2 | 1 | -1 | 2,3 | |
| 103 | Resource3 | Value3 | 1 | 2 | | |
| 104 | Resource1 | Value4 | 1 | 3 | | |

---- Base Plan 1
---- Delta Plan 2
---- Delta Plan 3

BoM Component Table 820

| Identity | Name | Value | Plan Id | New Plan Id | New Plan List | Applied |
|---|---|---|---|---|---|---|
| 101 | Component1 | Value1 | 1 | -1 | 2,3 | 1 |
| 102 | Component2 | Value2 | 1 | -1 | 2,3 | |
| 103 | Component3 | Value3 | 1 | 2 | | |
| 104 | Component1 | Value4 | 1 | 3 | | |

---- Base Plan 1
---- Delta Plan 2
---- Delta Plan 3

Routing Table 830

| Identity | Name | Value | Plan Id | New Plan Id | New Plan List | Applied |
|---|---|---|---|---|---|---|
| 101 | Routing1 | Value1 | 1 | -1 | 2,3 | 1 |
| 102 | Routing2 | Value2 | 1 | -1 | 2,3 | |
| 103 | Routing3 | Value3 | 1 | 2 | | |
| 104 | Routing1 | Value4 | 1 | 3 | | |

---- Base Plan 1
---- Delta Plan 2
---- Delta Plan 3

Demand Table 840

| Identity | Name | Value | Plan Id | New Plan Id | New Plan List | Applied |
|---|---|---|---|---|---|---|
| 101 | Demand1 | Value1 | 1 | -1 | 2,3 | 1 |
| 102 | Demand2 | Value2 | 1 | -1 | 2,3 | |
| 103 | Demand3 | Value3 | 1 | 2 | | |
| 104 | Demand1 | Value4 | 1 | 3 | | |

---- Base Plan 1
---- Delta Plan 2
---- Delta Plan 3

Fig. 8

User Actions Table 910

| Identity | Plan_Identity | Base_Plan_Identity | Action_Type | Table_Name | Action |
|---|---|---|---|---|---|
| 101 | 2 | 1 | INSERT | Resource | XML STRING 1 |
| 102 | 3 | 1 | UPDATE | Resource | XML STRING 2 |
| 103 | 2 | 1 | INSERT | BoM Component | XML STRING 3 |
| 104 | 3 | 1 | UPDATE | BoM Component | XML STRING 4 |
| 105 | 2 | 1 | INSERT | Routing | XML STRING 5 |
| 106 | 3 | 1 | UPDATE | Routing | XML STRING 6 |
| 107 | 2 | 1 | INSERT | Demand | XML STRING 7 |
| 108 | 3 | 1 | UPDATE | Demand | XML STRING 8 |

Fig. 9

Plans Table 1010

| Plan_Id | Base_Plan_Id |
|---------|--------------|
| 1 | -1 |
| 2 | 1 |
| 3 | 1 |

Fig. 10

SIMULATION OF SUPPLY CHAIN PLANS USING DATA MODEL

FIELD

One embodiment is directed generally to a computer system, and in particular to a supply chain planning system.

BACKGROUND

Supply chain planning is the planning of a network of interconnected businesses involved in an ultimate provision of product and service packages required by end customers. Supply chain planning can entail all movement and storage of raw materials, work-in-process inventory, and finished goods from point of origin to point of consumption (identified as a "supply chain"). Supply chain planning can also encompass the planning of all activities involved in sourcing, procurement, conversion, and logistics management.

Conventional supply chain planning systems are generally run utilizing batch processing. Batch processing is an execution of a series of programs on a computer without manual intervention. In a batch processing scenario, planning data is collected from enterprise resource planning ("ERP") systems and loaded into a database. A planning engine is then run in a batch mode. As the planning engine runs in the batch mode, the planning engine loads the planning data from the database and creates an object residing in an memory of the computer. The planning engine then runs various algorithms on the in-memory object to generate a supply chain planning solution corresponding to the plan that is persisted back into the database. Once the solution is persisted back into the database, the batch run completes, and a user can view the solution from the database.

Conventional supply chain planning systems which utilize batch processing can have an end-to-end runtime of over eight hours. Furthermore, during the batch processing time period, the user cannot interact with the supply chain planning system. For example, while the batch process is ongoing, the user cannot make changes to the planning data, generate a new plan, or run a planning algorithm on the in-memory object in order to perform an alternative scenario analysis on the generated plan.

SUMMARY

One embodiment is directed to a computer-readable medium having instructions stored thereon that, when executed by a processor, cause the processor to perform a method. The instructions include creating planning data and creating a base plan using the planning data, wherein the base plan includes an independent plan that includes all the planning data for the plan. The instructions further includes making changes to the base plan and saving the changes to the base plan as a delta plan, wherein the delta plan includes a dependent plan that includes changes to the base plan, and wherein the delta plan depends on the base plan.

Another embodiment is directed to a computer-readable medium having instructions stored thereon that, when executed by a processor, cause the processor to perform a method. The instructions include loading a plan into a planning web service, wherein the plan includes planning data, and modifying the planning data of the plan. The instructions further include running a planning algorithm on the plan to generate a planning solution, saving the plan, and unloading the plan from the planning web service.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates a base-plus-delta model of a plan according to an embodiment of the invention.

FIG. 8 illustrates an implementation of the base-plus-delta model according to an embodiment of the invention.

FIG. 9 illustrates an implementation of the base-plus-delta model according to an embodiment of the invention.

FIG. 10 illustrates an implementation of the base-plus-delta model according to an embodiment of the invention.

DETAILED DESCRIPTION

In one embodiment, the term "supply chain plan" (or "plan") refers to a collection of planning data (such as resources, components of resources, resource requirements, supplies, demands, activities, activity resources, items, bill of materials (BoM), calendars, routings, suppliers, sales, and forecasts) associated with transforming BoM components, into a finished product that is delivered to an end customer. The term "supply chain scenario" (or "scenario") refers to a simulation of real-world events that can affect a plan, and in particular, affect the viability of a plan for achieving a desired goal related to transforming BoM components, into a finished product that is delivered to an end customer. The term "supply chain solution" (or "solution") refers to an application of a plan to a scenario. A solution can be stored along with a plan, with the solution being associated with the plan.

As described above, in a conventional supply chain planning system which utilizes batch processing, a user cannot interact with the supply chain planning system, such as making changes to the planning data, generating a new plan, generating a solution based on the generated plan, or performing an alternative scenario analysis on the generated plan. Instead, the user must make changes to the database plan after the planning engine has completed its batch process and rerun the batch process. Due to the long runtime of the batch process, generating multiple plans, or performing alternative scenario analyses can be inefficient.

According to one embodiment of the invention, a new computer-readable medium, computer-implemented method, and system can provide for an interactive supply chain planning system which can allow a user to make changes to the planning data, generate a new plan, generate a new solution based on the generated plan, or perform an alternative scenario analysis on the generated plan. In one embodiment, a new model for representing planning data, identified as a "base-plus-delta" model is provided. In another embodiment, a new implementation of a planning web service is provided. In another embodiment, a new technique for copying plans to perform an alternative scenario analysis on the copied plan is provided. In another embodiment, an automatic propagation of user changes from a database directly to an object residing in a memory is provided. In certain embodiments of the invention, two or more of the described features (i.e., base-plus-delta model, web service implementation, technique for copying plans, and automatic propagation of user changes), can be combined to provide an interactive supply chain planning system.

Figure 1:
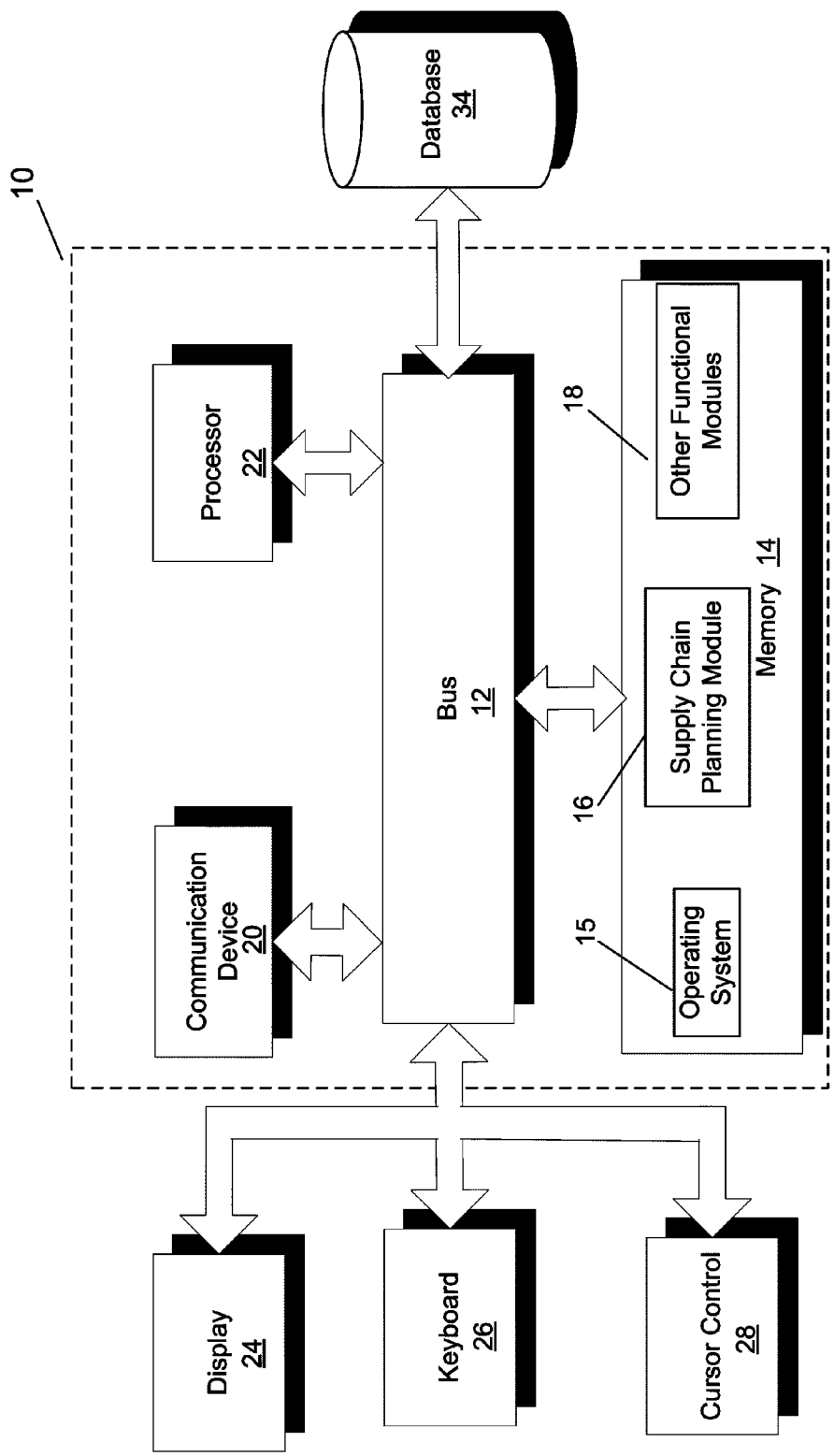
FIG. 1 illustrates a block diagram of a system that may implement an embodiment of the invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. Computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a supply chain planning module 16, as well as other functional modules 18. Operating system 15 can provide an operating system functionality for system 10. Supply chain planning module 16 can provide functionality for creating and editing a supply chain plan, and running a planning algorithm on a supply chain plan to create a supply chain solution, as will be described in more detail below. System 10 can also be part of a larger system. Thus, system 10 can include one or more additional functional modules 18 to include the additional functionality. For example, functional modules 18 may include modules that are part of the "Rapid Planning" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
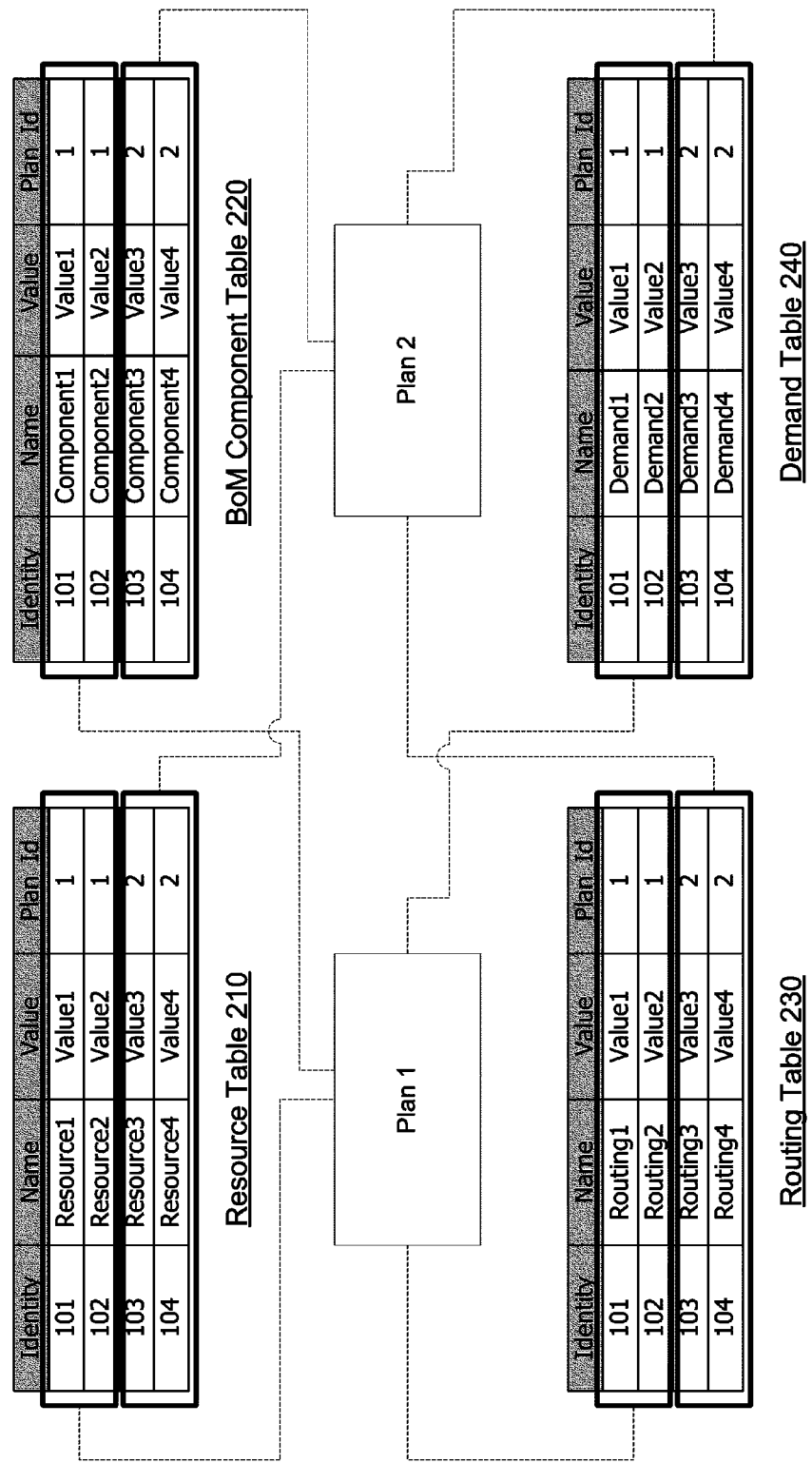
FIG. 2 illustrates an implementation of a plan according to an embodiment of the invention.

As previously described, a plan is a collection of planning data associated with transforming resources into a finished product. According to embodiments of the invention, a plan can be implemented several different ways in a supply chain planning system. FIG. 2 illustrates an implementation of a plan according to an embodiment of the invention. According to the embodiment, a plan is represented by a collection of database tables. FIG. 2 includes four database tables, resource table 210, BoM component table 220, routing table 230, and demand table 240. However, the database tables illustrated in FIG. 2 are merely an example collection of database tables according to an embodiment of the invention, and a plan can be represented by any number of database tables. Furthermore, the database tables that make up a plan are not limited to the same database tables as resource table 210, BoM component table 220, routing table 230, and demand table 240, and in other embodiments of the invention, the database tables can be different database tables that represent one or more items that can be used in a plan.

According to the embodiment, each database table represents a collection of records, where each record represents an item that can be used in a plan. For example, resource table 210 includes a collection of resource records, where each resource record represents a resource that can be used in a plan. Likewise BoM component table 220, routing table 230, and demand table 240 each include a collection of BoM component records, routing records, and demand records, respectively. Each BoM component record, routing record, and demand record, respectively represents a BoM component, routing step, and demand, respectively, that can be used in a plan.

In the illustrated embodiment of FIG. 2, resource table 210, BoM component table 220, routing table 230, and demand table 240 each include four records. As illustrated in FIG. 2, a record is a row of a database table. As also illustrated in FIG. 2, a first plan (i.e., Plan 1) includes the first two records of each database table, and a second plan (i.e., Plan 2) includes the second two records of each database table. Thus, as illustrated in FIG. 2, each database table may include records for more than one plan, and each plan can include a collection of records distributed among one or more database tables.

Figure 3:
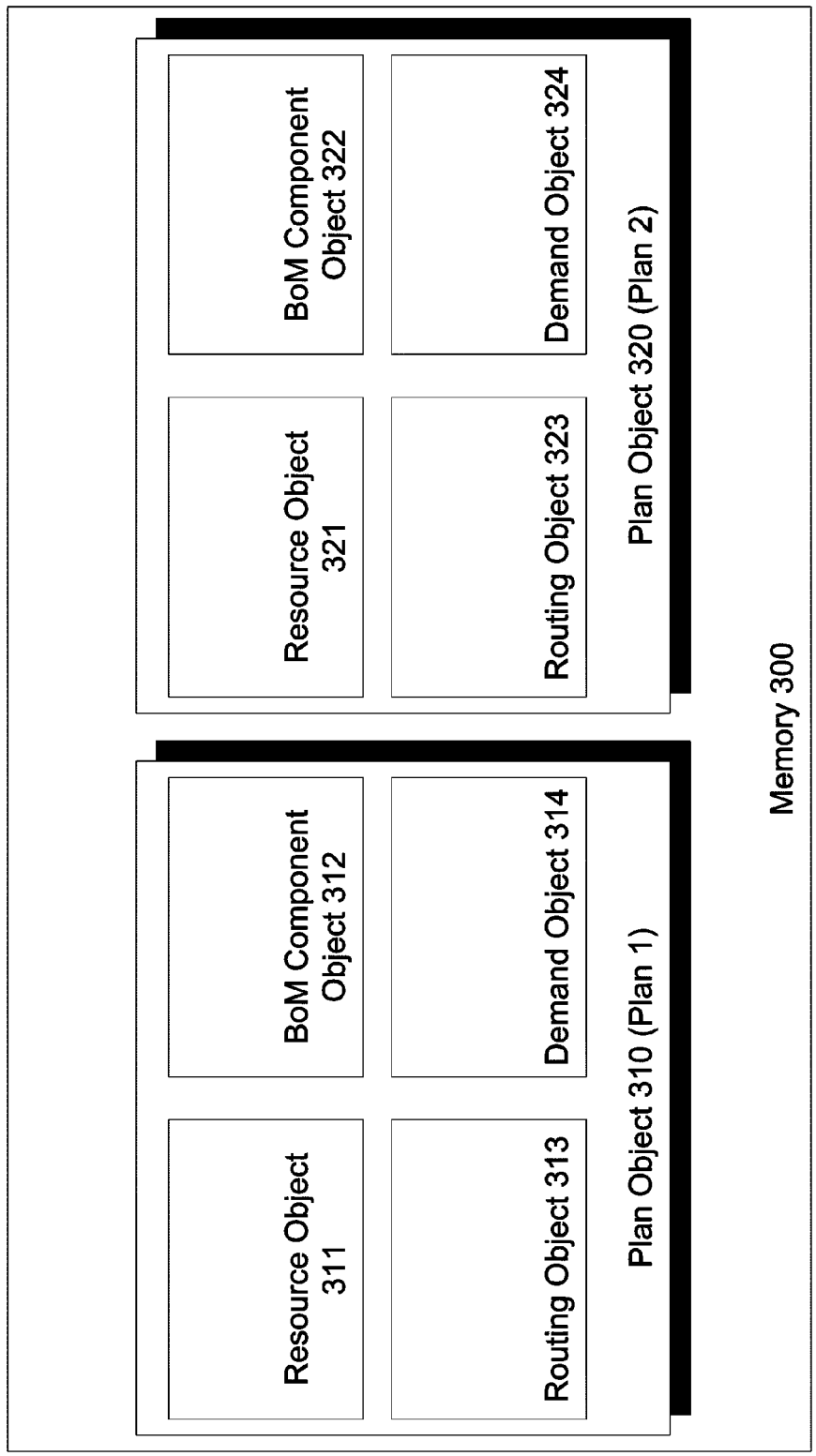
FIG. 3 illustrates an implementation of a plan according to another embodiment of the invention.

FIG. 3 illustrates an implementation of a plan according to another embodiment of the invention. According to the embodiment, a plan is represented by an object residing in a memory (identified as an "in-memory object"). An object is a programming data structure which includes data values and procedures that can manipulate the data values. Once an object is created by a software module, the object resides in an memory while the object is in use by the module. The object is then removed from the memory once the object is no longer in use by the module. An object can be created by instantiating the object, and then reading the data values into the object model from a centralized location, such as a database or a file.

In the illustrated embodiment of FIG. 3, a memory 300 includes two in-memory objects, plan object 310 (which represents plan 1), and plan object 320 (which represents plan 2). Each plan object includes an object which represents an item that can be used in a plan. In the illustrated embodiment, plan object 310 includes resource object 311, BoM component object 312, routing object 313, and demand object 314, while plan object 320 includes resource object 321, BoM component object 322, routing object 323, and demand object 324. However the representation of plan objects in FIG. 3 is merely an example representation according to an embodiment of the invention, and a plan can include any number of item objects. Furthermore, a plan object is not limited to the item objects illustrated in FIG. 3, and in other embodiments of the invention, a plan object can include different item objects. In addition, while plan object 310 and plan object 320 each include only one instance of a resource object, BoM component object, routing object, and demand object, this is merely an example embodiment, and in other embodiments of the invention, a plan object can include multiple instances of an item object.

According to the embodiment, each item object represents an item that can be used in a plan. For example, resource object 311 and resource object 321 each represent a resource that can be used in a plan. Likewise, BoM component object 312 and BoM component object 322 each represent a BoM component that can be used in a plan, routing object 313 and routing object 323 each represent a routing step that can be used in a plan, and demand object 314 and demand object 324 each represent a demand that can be used in a plan.

Figure 4:
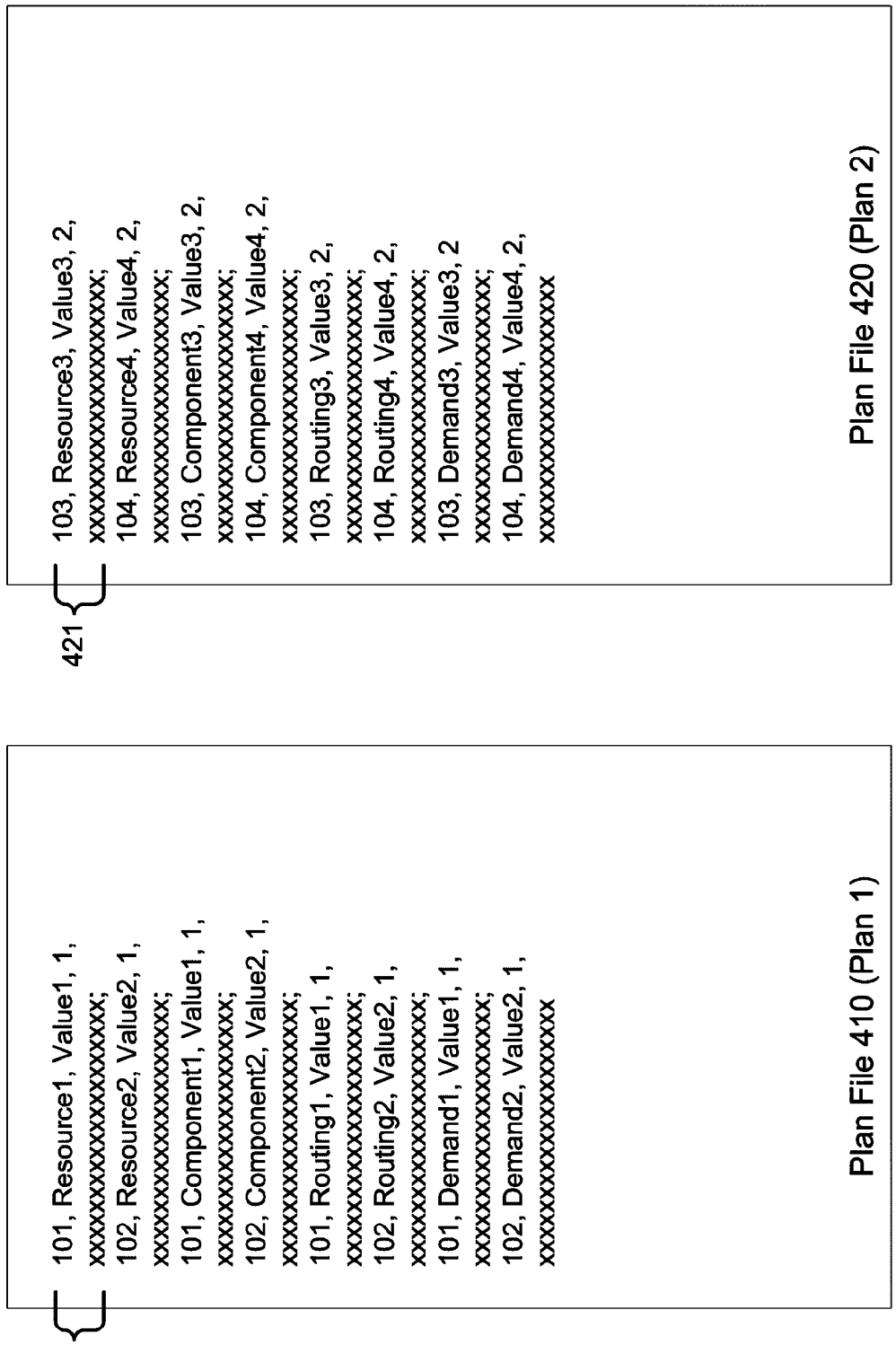
FIG. 4 illustrates an implementation of a plan according to another embodiment of the invention.

FIG. 4 illustrates an implementation of a plan according to another embodiment of the invention. According to the embodiment, a plan is represented by a computer file (or "file"). A file is a block of information, or a resource, configured to store information, which is available to a software module. A file is generally a durable storage resource configured to store information, where the information can be retrieved at a later point in time. For example, a file can be a flat file, which is a plain text (or mixed text and binary) file. A flat file can be used to store a database model (such as a database table) as a singular file. A flat file can contain database records, with each record being represented by a set of text or binary characters. In one example, a flat file can store one record per line of the flat file. However, as one of ordinary skill in the art would readily appreciate, a file can include other types of durable electronic storage known to one of ordinary skill in the art, such as a text file, a binary file, and a Microsoft Excel® file.

In the illustrated embodiment of FIG. 4, plan file 410 (which represents plan 1) is a file containing records of plan 1, and plan file 420 (which represents plan 2) is a file containing records of plan 2. In the illustrated embodiment of FIG. 4, the records of plan file 410 are similar to the records of plan 1 of FIG. 2, and the records of plan file 420 are similar to the records of plan 2 of FIG. 2. Plan file 410 includes records 411 and 421, which are examples of records contained within plan file 410 and plan file 420, respectively, according to an embodiment of the invention. Record 411 contains the following record values "101," "Resource1," "Value1," "1," and "xxxxxxxxxxxxxxxxxxxx." Each value represents a different field of the record. The value "101" represents the identity of the record. The value "Resource1" represents the name of the record. The value "Value1" represents the value of the resource record. The value "1" represents the plan identity of the record (i.e., which plan the record belongs to). The value "xxxxxxxxxxxxxxxxxxxx" represents additional values of the record. Record 421 contains similar values, but because it is associated with plan 2, it contains the plan identity value "2" instead of "1." In records 411 and 421, each value is separated by a comma, and each record in plan files 410 and 420 is separated by a semi-colon. However these are merely example field delimiters and record delimiters and any field delimiter and record delimiter known in the art can be used to separate fields in a record, and to separate records in a file.

As one of ordinary skill in the art would readily appreciate, plan file 410 and plan file 420 are merely example file implementations of a plan, and that a file may have a different format than the format illustrated in FIG. 4, or may organize information in a different format than the organization format illustrated in FIG. 4, and still be within the scope of the invention.

Figure 5:
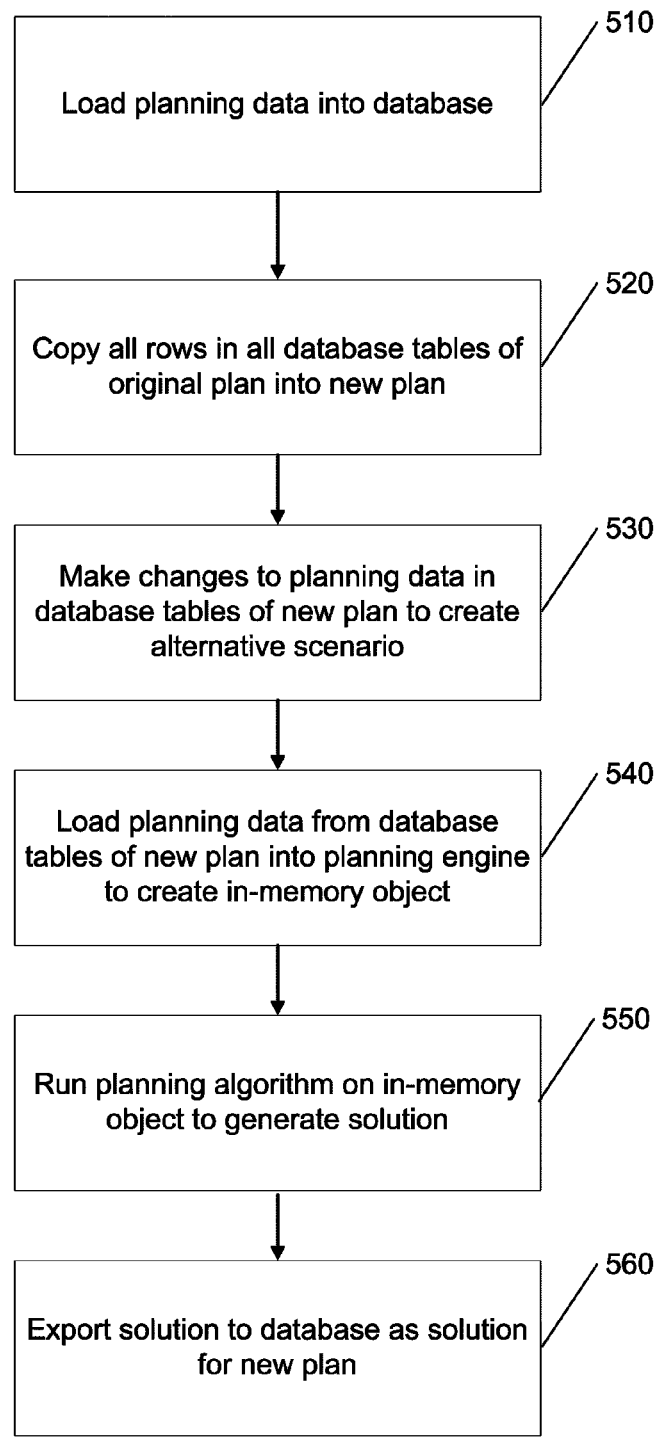
FIG. 5 illustrates a flow diagram of the functionality of an interactive supply chain planning system involving a database according to an embodiment of the invention.

FIG. 5 illustrates a flow diagram of the functionality of an interactive supply chain planning system involving a database according to an embodiment of the invention. In the illustrated embodiment, the method is a method for creating a new plan, which is a copy of a new plan, making changes to the plan based on an alternative scenario, and running a planning algorithm on the new plan to generate a new solution.

At 510, planning data is loaded into a database. According to an embodiment of the invention, the database is a Planning Data Store (PDS). A PDS is a replication of a database containing production planning data of a supply chain system, where the PDS is specifically configured for a corresponding supply chain planning system. For example, a snapshot, or copy, of a database containing production planning data may be created at a specific date and time, and the snapshot, or copy, of the database can be stored in a PDS.

At 520, a copy of an original plan (i.e., a new plan) is created by copying all rows of all tables in the database associated with the original plan. For example, all database table rows which include a plan identity value that corresponds to the plan identify of the original plan is selected and copied into new database table rows. At 530, changes are made to the planning data in the database tables associated with the new plan to create an alternate scenario. For example, a value associated with an item represented in a copied database table row can be modified from a first value to a second value.

At 540, planning data from database tables associated with the new plan is loaded into a planning engine to create an in-memory object. A planning engine is a software module configured to apply a planning algorithm to a plan to generate a solution. In one embodiment, a planning engine can include supply chain planning module 16 of FIG. 1. As previously described, an in-memory object is an object created by a software module, where the object represents a plan, and where the object is stored in a memory while the object is in use by the module. Thus, the in-memory object is a model of the plan.

At 550, the planning engine runs a planning algorithm on the in-memory object to generate a solution for the new plan. A planning algorithm compares a plan with a scenario and analyzes whether the plan can achieve a desired outcome when applied to the scenario. As previously described, a solution is an application of a plan to a scenario in order to achieve a desired outcome. At 560, the solution is exported to the database as a solution for the new plan.

However, according to the embodiment, creating a complete copy of the planning data associated with a plan in the database can be a time-consuming step. Similarly, loading the planning data from the database to create an in-memory object can be a time-consuming step. Furthermore, exporting the solution back into the database can also be a time-consuming step.

Figure 6:
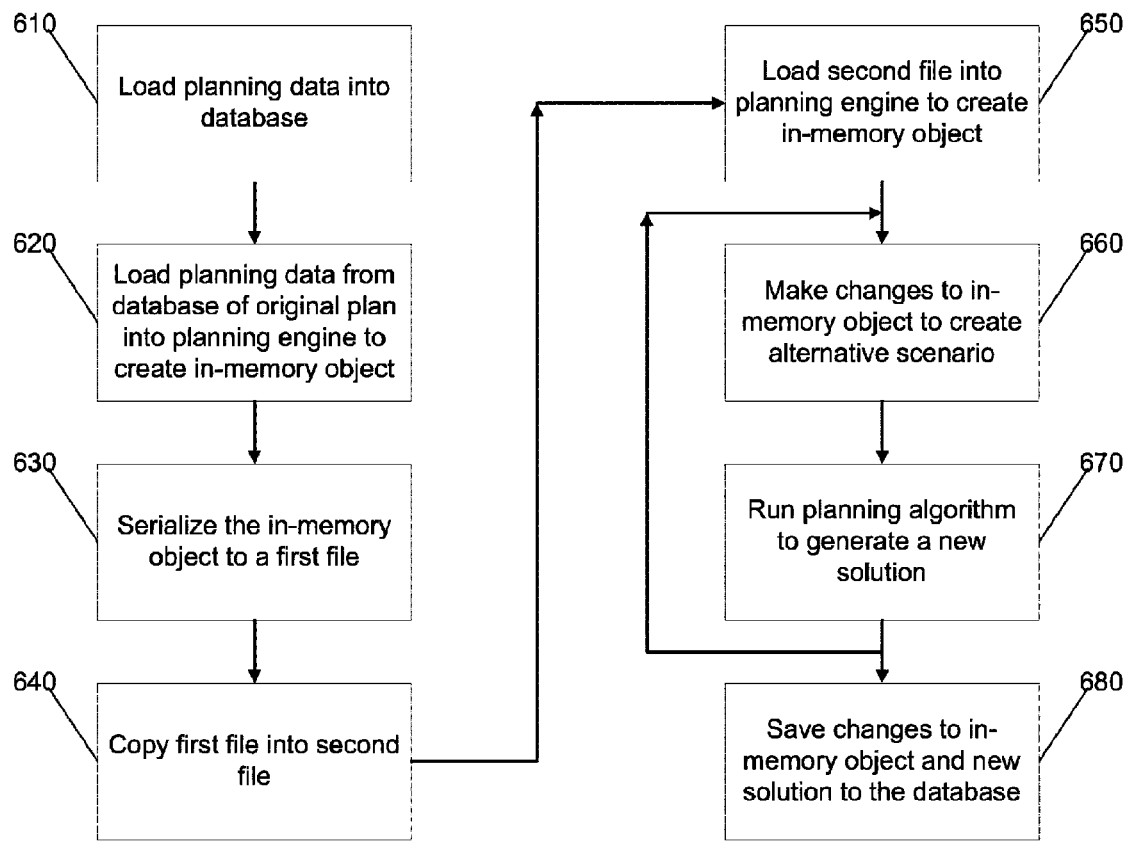
FIG. 6 illustrates a flow diagram of the functionality of an interactive supply chain planning system involving a file according to an embodiment of the invention.

FIG. 6 illustrates a flow diagram of the functionality of an interactive supply chain planning system involving a file according to an embodiment of the invention. In the illustrated embodiment, the method is a method for creating a new plan, which is a copy of a new plan, making changes to the plan based on an alternative scenario, and running a planning algorithm on the new plan to generate a new solution.

At 610, planning data is loaded into a database. According to an embodiment of the invention, the database is a PDS. At 620, planning data from database tables associated with an original plan is loaded into a planning engine to create an in-memory object. As previously described, a planning engine is a software module configured to apply a planning algorithm to a plan to generate a solution. In one embodiment, a planning engine can include supply chain planning module 16 of FIG. 1. As previously described, an in-memory object is an object created by a software module, where the object represents a plan, and where the object is stored in a memory while the object is in use by the module.

At 630, the in-memory object is serialized into a first file. Serialization is the process of saving the current state of an object to a sequence of bytes, such as a stream. The sequence of bytes serves as a container for the object, where the sequence of bytes includes a partial representation of the object's data values and procedures. Through serialization, the object may be stored on a storage medium, such as a file, so that the information stored in the sequence of bytes can later be used to construct an equivalent object containing the same data values and procedures as the original object. This construction of an equivalent object is known as deserialization. As described above, a file is a block of information, or a resource configured to store information, which is available to a software module. At 640, the first file is copied into a second file. The second file represents a new plan, which is a copy of the original plan.

At 650, the second file is loaded into a planning engine to create an in-memory object. At 660, changes are made to the in-memory object associated with the new plan to create an alternate scenario. For example, a value associated with an item represented in the in-memory object can be modified from a first value to a second value.

At 670, the planning engine runs a planning algorithm on the in-memory object to generate a solution for the new plan. As previously described, a planning algorithm compares a plan with a scenario and analyzes whether the plan can achieve a desired outcome when applied to the scenario, and a solution is an application of a plan to a scenario in order to achieve a desired outcome. The actions at 660 and 670 can be repeated as many times as desired. At 680, the changes made to the in-memory object and the new solution are saved to the database.

According to the embodiment, the method utilizing a file rather than a database can be faster, since changes are made directly to the in-memory object rather than the database. However, the method does not possess the transactional, multi-user, and auditing capabilities provided by a database. Such capabilities include rolling back an entire transaction if one step of the transaction fails, preventing two or more uses from accessing data at the same time, and archiving information such as who made changes to the data, and what changes were made.

According to an embodiment of the invention, a new computer-readable medium, computer-implemented method, and system that combines the speed of a method utilizing a file and the transactional, multi-user, and auditing capabilities of a method utilizing a database is provided. Such an embodiment can include one or more of the following features, which will be discussed in more detail: (1) a base-plus-delta model for representing planning data; (2) an implementation of a planning web service; (3) a technique for fast copying of plans to create alternate scenarios; and (4) automatic propagation of changes from a database to corresponding changes in an in-memory object.

According to an embodiment of the invention, a plan can be represented using a "base-plus-delta" model. According to the embodiment, a plan can include two components: a base plan and a delta plan. A base plan is an independent plan that includes all planning data of the plan, and does not depend upon any other plans. For example, in a database implementation of a plan, a base plan includes a complete set of database tables and rows that make up the plan. In contrast, a delta plan is a dependent plan that is dependent on a base plan, and does not include all planning data of the plan. For example, in a database implementation of a plan, a delta plan does not include a complete set of database tables and rows that make up the plan. A delta plan only includes changes to a base plan. For all other planning data, a delta plan refers to the original data in a base plan. Thus, a plan can either include a base plan, or a base plan and a delta plan.

FIG. 7 illustrates a base-plus-delta model of a plan according to an embodiment of the invention. FIG. 7 includes plan 700 and plan 710, where plan 710 is a copy of plan 700. Plan 700 is represented as a base plan, which as described above, is an independent plan that includes all planning data of the plan. When plan 700 is copied, plan 710 is created, which is represented as a base plan and delta plan. Plan 710 includes a reference to the base plan of 700. Thus, the base plan of 700 is not actually copied, and instead, a reference to the base plan is created. Furthermore, when plan 700 is copied, a delta plan for plan 710 is created. As described above, a delta plan is not an independent plan, but is dependent on a base plan, and includes planning data changes for that base plan. Since plan 710 is created as a copy of plan 700, the delta plan of 710 does not include any changes. However, once a change to plan 710 is made, the change is saved in the delta plan of 710.

FIGS. 8, 9, and 10 illustrate an implementation of the base-plus-delta model according to an embodiment of the invention. As one of ordinary skill in the art would readily appreciate, FIGS. 8, 9, and 10 illustrate example embodiments of the invention, and an implementation of the base-plus-delta model may use a different format than the formats illustrated in FIGS. 8, 9, and 10, and still be within the scope of the invention.

FIG. 8 illustrates a database implementation of the base-plus-delta model where base plans and delta plans are stored in a database. As described above, in a database implementation embodiment, each database table represents a collection of records, where each record represents an item that can be used in a plan. In the illustrated embodiment of FIG. 8, similar to the embodiment of FIG. 2, a database includes four database tables, resource table 810, BoM component table 820, routing table 830, and demand table 840. However, the database tables illustrated in FIG. 8 are merely an example collection of database tables according to an embodiment of the invention, and a plan can be represented by any number of database tables. Furthermore, the database tables that make up a plan are not limited to the same database tables as resource table 810, BoM component table 820, routing table 830, and demand table 840, and in other embodiments of the invention, the database tables can be different database tables.

According to the embodiment, similar to the embodiment illustrated in FIG. 2, each database table represents a collection of records, where each record represents an item that can be used in a plan. For example, resource table 810 includes a collection of resource records, where each resource record represents a resource that can be used in a plan. Likewise BoM component table 820, routing table 830, and demand table 840 each include a collection of BoM component records, routing records, and demand records, respectively. Each BoM component record, routing record, and demand record, respectively represents a BoM component, routing step, and demand, respectively, that can be used in a plan. As illustrated in FIG. 8, a record is a row of a database table.

Resource table 810, BoM component table 820, routing table 830, and demand table 840 each include seven columns: Identity, Name, Value, Plan_Id, New_Plan_Id, New_Plan_List, and Applied. Column Identity contains a unique identity in order to distinguish each record of each table. Columns Name and Value contain a name and value of the record respectively. Columns Plan_Id, New_Plan_Id, New_Plan_List, and Applied identify which plan each record belongs to, and can help identify whether the record is associated with a base plan or delta plan, as will be described in more detail.

As illustrated in FIG. 8, resource table 810, BoM component table 820, routing table 830, and demand table 840, each include four records, where the records with an identity of 101 and 102 for each table belong to Base Plan 1, the record with an identity of 103 for each table belongs to Delta Plan 2, and the record with an identity of 104 for each table belongs to Delta Plan 3.

Base Plan 1 is a base plan, which as described above, is an independent plan. Delta Plan 2 and Delta Plan 3 are each delta plans, with each delta plan being dependent on Base Plan 1. Delta Plan 2 and Delta Plan 3 each include a reference to Base Plan 1, and a change to Base Plan 1. Specifically, Delta Plan 2 includes the addition of four new records: a new resource record in resource table 810 with a name of "Resource3" and a value of "Value3;" a new BoM component record in BoM component table 820 with a name of "Component3" and a value of "Value3;" a new routing record in routing table 830 with a name of "Routing3" and a value of "Value3;" and a new demand record in demand table 840 with a name of "Demand3" and a value of "Value3." While Delta Plan 2 includes new records, Delta Plan 3 includes an updated value for four pre-existing records of Base Plan 1. Specifically, in Delta Plan 3 the resource record in resource table 810 with a name "Resource1" has had its value updated from "Value1" to "Value4;" the BoM component record in BoM component table 820 with a name "Component1" has had its value updated from "Value1" to "Value4;" the routing record in routing table 820 with a name "Routing1" has had its value updated form "Value1" to Value4;" and the demand record in demand table 840 with a name "Demand1" has had its value updated from "Value1" to "Value4."

Thus, resource table 810, BoM component table 820, routing table 830, and demand table 840 each includes records for three plans: a first plan including Base Plan 1, a second plan including Base Plan 1 and Delta Plan 2, and a third plan including Base Plan 1 and Delta Plan 3.

According to the embodiment, since each record in resource table 810, BoM component table 820, routing table 830, and demand table 840 can either be associated with a base plan or associated with a delta plan, resource table 810, BoM component table 820, routing table 830, and demand table 840 each include columns Plan_Id, New_Plan_Id, New_Plan_List, and Applied. These columns can help identify whether a record is associated with a base plan or associated with a delta plan.

Column Plan_Id represents the base plan that a record is associated with, and column New_Plan_Id represents the delta plan (if any) that the record is associated with. If a record has a valid value for both columns, then the record is associated with a delta plan. For example, the resource record in resource table 810 with a name "Resource3" has a value of 1 in column Plan_Id, and a value of 2 in column New Plan_Id. This signifies that the record is associated with a delta plan (i.e., Delta Plan 2), which references a base plan (i.e., Base Plan 1).

Column New_Plan_List identifies the delta plans that are associated with the base plan. For example, in FIG. 8, the resource record in resource table 810 with a name "Resource1" has a value of "2,3" for column New_Plan_List, identifying that delta plans 2 and 3 depend upon base plan 1. Column Applied identifies that a change has been made to a value of a base plan in a delta plan. For example, in FIG. 8, the resource record in resource table 810 with a name "Resource1" has a value of 1 for column Applied, identifying that the value of the record has been changed in a corresponding delta plan.

As can be seen in FIG. 8, based on this format, resource table 810, BoM component table 820, routing table 830, and demand table 840 each have two records associated with Base Plan 1, a third record associated with Delta Plan 2, and a fourth record associated with Delta Plan 3.

FIG. 9 illustrates an implementation of the base-plus-delta model according to an embodiment of the invention. The database table illustrated in FIG. 9, user actions table 910, is an optional table that may be included according to the embodiment, in addition to the database tables illustrated in FIG. 8 to track the delta plan changes illustrated in FIG. 8. Specifically, each record in user actions table 910 corresponds to a change to Base Plan 1 made in either Delta Plan 2 or Delta Plan 3, as will be described in more detail.

User actions table 910 includes columns Identity, Plan_Identity, Base_Plan_Identity, Action_Type, Table_Name, and Action. Column Identity contains a unique identity in order to distinguish each change record of user actions table 910. Column Plan_Identity identifies the delta plan that the change is associated with. Column Base_Plan_Identity identifies the base plan that the identified delta plan is associated with. Column Action_Type identifies the type of change. In the embodiment, the types of change include "INSERT," "UPDATE," and "DELETE." "INSERT" refers to a new record in a table of the base plan being inserted by a delta plan, "UPDATE" refers to a preexisting record in a table of the base plan being updated by a delta plan, and "DELETE" refers to a pre-existing record in a table of the base plan being deleted by a delta plan. Column Table_Name identifies the database table that was changed. Column Action identifies the specific change. In the embodiment, a value of column Action is represented by an Extensible Markup Language (XML) string.

As shown in FIG. 9, each record in user actions table 910 corresponds to a delta plan change as shown in FIG. 8. Specifically, records 101 and 102 of user actions table 910 represent records 103 and 104 of resource table 810, records 103 and 104 of user actions table 910 represent records 103 and 104 of BoM component table 820, records 105 and 106 of user actions table 910 represent records 103 and 104 of routing table 830, and records 107 and 108 of user actions table 910 represent records 103 and 104 of demand table 840. Thus, each delta plan record in FIG. 8 is represented by a corresponding record in user actions table 910 of FIG. 9 which provides additional information regarding the change, such as action type and action.

As described above, each record in user actions table 910 includes an Action field which includes an XML string. As also described above, each XML string includes information about the change to the base plan by the delta plan in an XML format.

For example, "XML STRING 1" as illustrated in FIG. 9 can represent the following XML string:

```
Id=3
planId=2
basePlanId=-1
Table=RESOURCE
<Create>
    <Update>
        <fieldName>IDENTITY</fieldName>
        <attributeName>Identity</attributeName>
        <javaType>oracle.jbo.domain.Number</javaType>
        <newValue>103</newValue>
    </Update>
    <Update>
        <fieldName>NAME</fieldName>
        <attributeName>ItemId</attributeName>
        <javaType>oracle.jbo.domain.String</javaType>
        <newValue>Resource3</newValue>
    </Update>
    <Update>
        <fieldName>VALUE</fieldName>
        <attributeName>OrgId</attributeName>
        <javaType>oracle.jbo.domain.String</javaType>
        <newValue>1</newValue>
    </Update>
    <Update>
        <fieldName>PLAN_ID</fieldName>
        <attributeName>SrInstanceId</attributeName>
        <javaType>oracle.jbo.domain.Number</javaType>
        <newValue>1</newValue>
    </Update>
    <Update>
        <fieldName>NEW_PLAN_ID</fieldName>
        <attributeName>NewPlanId</attributeName>
        <javaType>oracle.jbo.domain.Number</javaType>
        <newValue>2</newValue>
    </Update>
</Create>
```

This XML string represents the action of creating a new record in resource table 810 of FIG. 8, where the new record is associated with Delta Plan 2. The values "XML STRING 3," "XML STRING 5," and "XML STRING 7," represent similar XML strings for BoM component table 820, routing table 830, and demand table 840, respectively.

Likewise, "XML STRING 2" as illustrated in FIG. 9 can represent the following string:

```
Id=1
planId=3
basePlanId=1
Table=RESOURCE
<Update>
    <key>
        <row attributeName="Identity" fieldName="IDENTITY" value="101"></row>
        <row attributeName="Name" fieldName="NAME" value="Resource1"></row>
        <row attributeName="Value" fieldName="VALUE" value="Value1"></row>
        <row attributeName="PlanId" fieldName="PLAN_ID" value="1"></row>
        <row attributeName="NewPlanId" fieldName="NEW_PLAN_ID" value="-1"></row>
    </key>
    <fieldName>VALUE</fieldName>
    <attributeName>Value</attributeName>
    <javaType>oracle.jbo.domain.String</javaType>
    <newValue>Value1</newValue>
    <oldValue>Value4</oldValue>
</Update>
```

This XML string represents the action of updating a value of a pre-existing record in resource table 810 of FIG. 8, where the updated record is associated with Delta Plan 3. The values "XML STRING 4," "XML STRING 6," and "XML STRING 8," represent similar XML strings for BoM component table 820, routing table 830, and demand table 840.

As one of ordinary skill in the art would understand, user actions table 910 is merely an example embodiment, and database implementations according to other embodiments of the invention may use different database formats and still be within the scope of the invention. For example, a database table corresponding to user actions table 910 may include different columns, or use different values to represent plan identities, action types, table names, and actions, and still be within the scope of the invention.

In an embodiment of the invention, user actions table 910 of FIG. 9 can also include additional columns which identify auditing and versioning information. For example, user actions table 910 can include a Edit_Version column which identifies a version of the corresponding delta plan change, a Plan_Version column which identifies a version of the corresponding delta plan, a Created_By column which identifies who created the delta plan change.

FIG. 10 illustrates an implementation of the base-plus-delta model according to an embodiment of the invention. The database table illustrated in FIG. 10, plans table 1010, is an optional table that may be included according to the embodiment, in addition to the database tables illustrated in FIG. 8 and FIG. 9 to identify each plan as a base plan or delta plan. Specifically, plans table 1010 includes columns Plan_Id and Base_Plan_Id. Column Plan_Id identifies the plan identity of the plan. In an embodiment, column Plan_Id of plans table 1010 has the same value of column Plan_Id of resource table 810, BoM component table 820, routing table 830, and demand table 840 for each plan. In the illustrated embodiment of FIG. 10, the first record of plans table 1010 has a value of 1 for column Plan_Id. This record represents Base Plan 1. The second record of plans table 1010 has a value of 2 for column Plan_Id. This record represents Delta Plan 2. The third record of plans table 1010 has a value of 3 for column Plan_Id. This record represents Delta Plan 3. Column Base_Plan_Id identifies the base plan that the plan depends upon. If the plan is itself a base plan, then Column Base_Plan_Id includes a null value, or dummy value. In the illustrated embodiment of FIG. 10, the first record has a value of −1 (i.e., a dummy value) for column Base_Plan_Id because the record is associated with a base plan. However, the second and third records each have a value of 1 for column Base_Plan_Id because each record is associated with a delta plan that depends upon Base Plan 1.

As one of ordinary skill in the art would understand, plans table 1010 is merely an example embodiment, and database implementations according to other embodiments of the invention may use different database formats and still be within the scope of the invention. For example, a database table corresponding to plans table 1010 may include different columns, or use different values to represent base plans and delta plans, and still be within the scope of the invention.

Furthermore, in an embodiment of the invention, a query mechanism is provided to select all plan rows from a database, to select only base plan rows from the database, or to select only delta plan rows from the database. Since base plan rows and delta plan rows are separated, the query mechanism can query delta plan rows without starting from the base plan.

Figure 11:
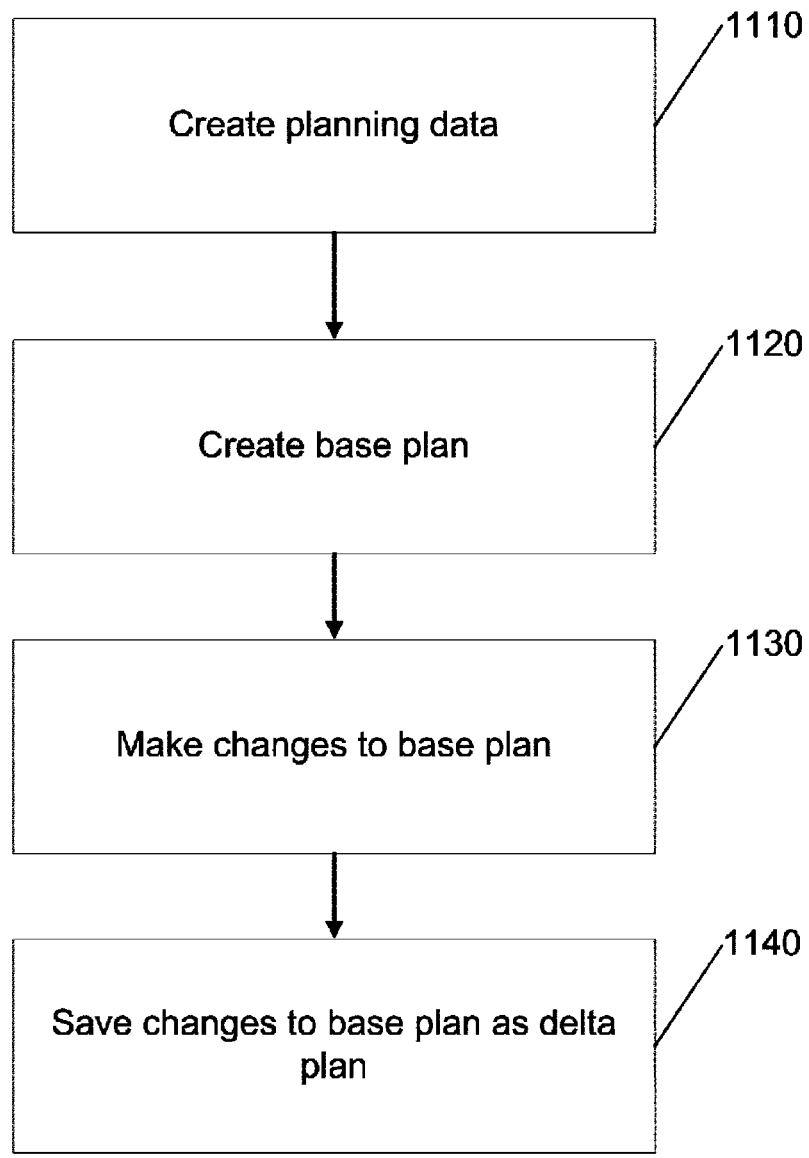
FIG. 11 illustrates a flow diagram of the functionality of the supply chain planning module when creating a base plan and a delta plan based on a base-plus-delta model according to an embodiment of the invention.

FIG. 11 illustrates a flow diagram of the functionality of the supply chain planning module when creating a base plan and a delta plan based on a base-plus-delta model according to an embodiment of the invention. In one embodiment, the functionality of the flow diagram of FIG. 11, as well as FIGS. 12, 13, 16, 17, 18, and 19, is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1110, planning data is created. According to an embodiment of the invention, planning data is created by loading planning data into a database, such as a PDS. At 1120, a base plan is created. In an embodiment of the invention, a base plan is created by creating records in one or more tables of a database that make up a base plan and identifying the records as belonging to the base plan. Thus, the base plan can include the planning data created at 1110. At 1130, changes to the base plan are made which correspond to a delta plan. In an embodiment of the invention, changes to base plan can include inserting one or more records of one or more database tables that make up a base plan, deleting one or more records of one or more database tables that make up a base plan, or updating one or more values of one or more records of one or more database tables. At 1140, changes to the base plan are saved as a delta plan. In an embodiment of the invention, changes to the base plan are saved as a delta plan by creating records in one or more tables of a database that make up a delta plan, identifying the records as belonging to the delta plan, and referencing the base plan that the delta plan depends upon.

Figure 12:
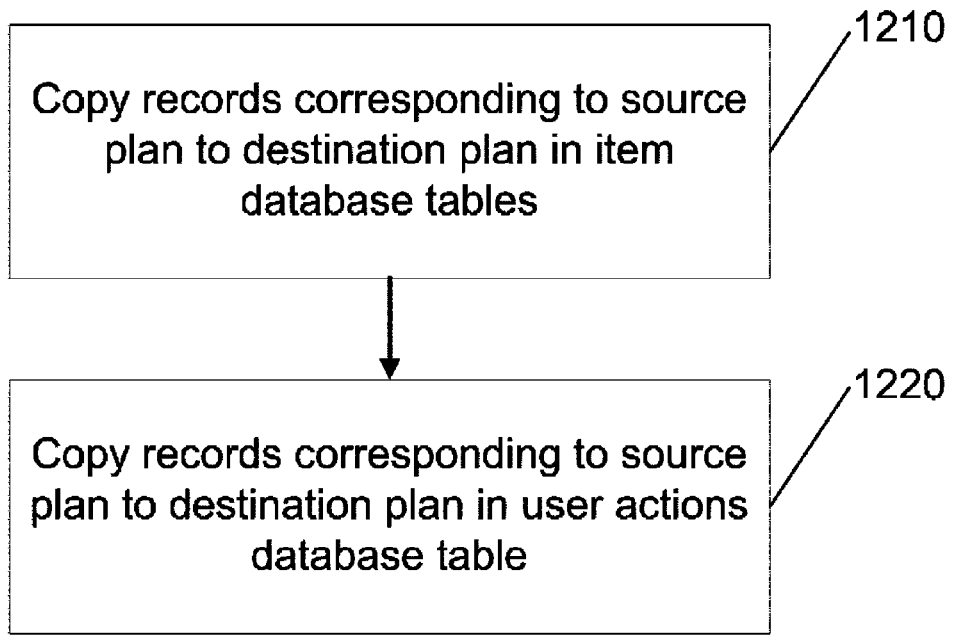
FIG. 12 illustrates a flow diagram of the functionality of the supply chain planning module when copying a plan based on a base-plus-delta model according to an embodiment of the invention.

FIG. 12 illustrates a flow diagram of the functionality of the supply chain planning module when copying a plan based on a base-plus-delta model according to an embodiment of the invention. At 1210, records in item database tables corresponding to an source plan are copied and identified with a destination plan. In an embodiment of the invention, the item database tables correspond to resource table 810, BoM component table 820, routing table 830, and demand table 840 of FIG. 8. In another embodiment, the item database tables correspond to any collection of database tables that represent items that make up a plan. At 1220, records in a user actions database table corresponding to a source plan are copied and identified with a destination plan. In an embodiment of the invention, the user actions database table corresponds to user actions table 910 of FIG. 9. In another embodiment, the user actions database table corresponds to a database table that is formatted to track delta plan changes.

Figure 13:
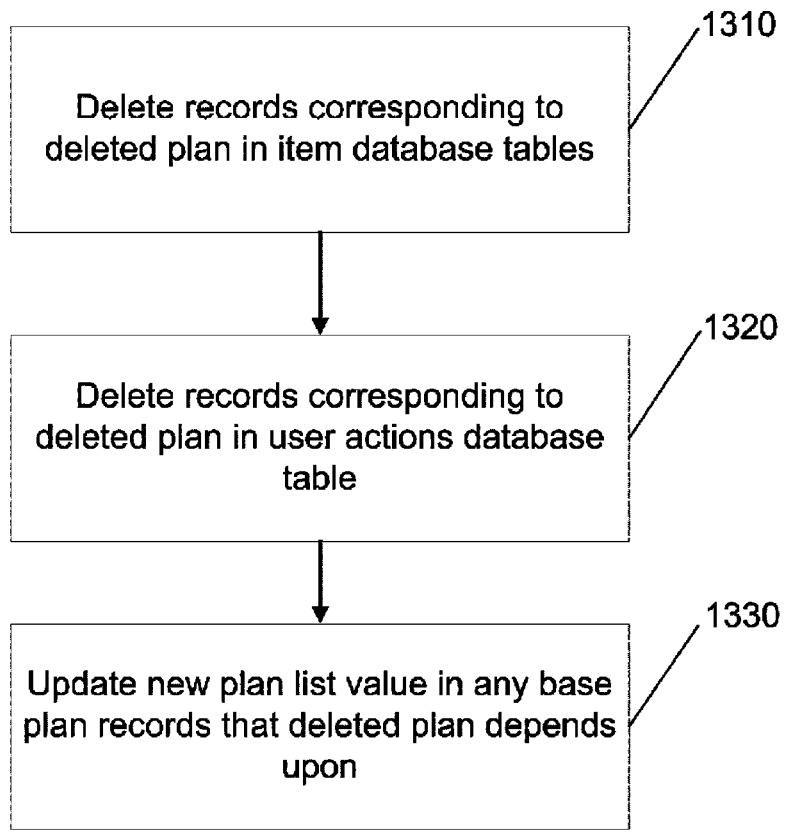
FIG. 13 illustrates a flow diagram of the functionality of the supply chain planning module when deleting a plan based on a base-plus-delta model according to an embodiment of the invention.

FIG. 13 illustrates a flow diagram of the functionality of the supply chain planning module when deleting a plan based on a base-plus-delta model according to an embodiment of the invention. At 1310, records in item database tables corresponding to a deleted plan are deleted. In an embodiment of the invention, the item database tables correspond to resource table 810, BoM component table 820, routing table 830, and demand table 840 of FIG. 8. In another embodiment, the item database tables correspond to any collection of database tables that represent items that make up a plan. At 1320, records in a user actions database table corresponding to a deleted plan are deleted. In an embodiment of the invention, the user actions database table corresponds to user actions table 910 of FIG. 9. In another embodiment, the user actions database table corresponds to a database table that is formatted to track delta plan changes. At 1330, a new plan list value is updated in any base plan record which the deleted plan depends upon. In an embodiment, the new plan list value corresponds to column New_Plan_List of resource table 810, BoM component table 820, routing table 830, and demand table 840 of FIG. 8. In another embodiment, the new plan list value corresponds to a value configured to identify the delta plans that correspond to a base plan.

According to an embodiment of the invention, a base-plus-delta model can provide an advantage of fast copying. Specifically, because a delta plan only includes new and updated records of a plan, there is a significantly smaller number of records in a delta plan compared to a base plan. Accordingly, copying a plan represented by a base-plus-delta model can be faster than copying a plan represented by a single plan model.

According to another embodiment of the invention, a planning engine can be run as a web service (identified as a "planning web service"). In the embodiment, one or more plans can be loaded from a database into the planning web service as an in-memory object. Once the one or more plans have been loaded as an in-memory object, a user can interact with the plan through the planning web service. For example, a user can modify the planning data of the in-memory object, to create an alternate scenario, and can run a planning algorithm on the in-memory object to generate a solution. In an embodiment, the planning web service can expose various methods that facilitate a user to modify the planning data to create an alternate scenario, and to generate a solution. According to an embodiment, the planning web service can run indefinitely unless terminated by an administrator. Since the web service can run indefinitely, a user can interactively modify the planning data, re-solve the plan, and repeat the cycle as many time as needed. Therefore, the user can interactively create and analyze various scenarios and their impact on the plan.

Figure 14:
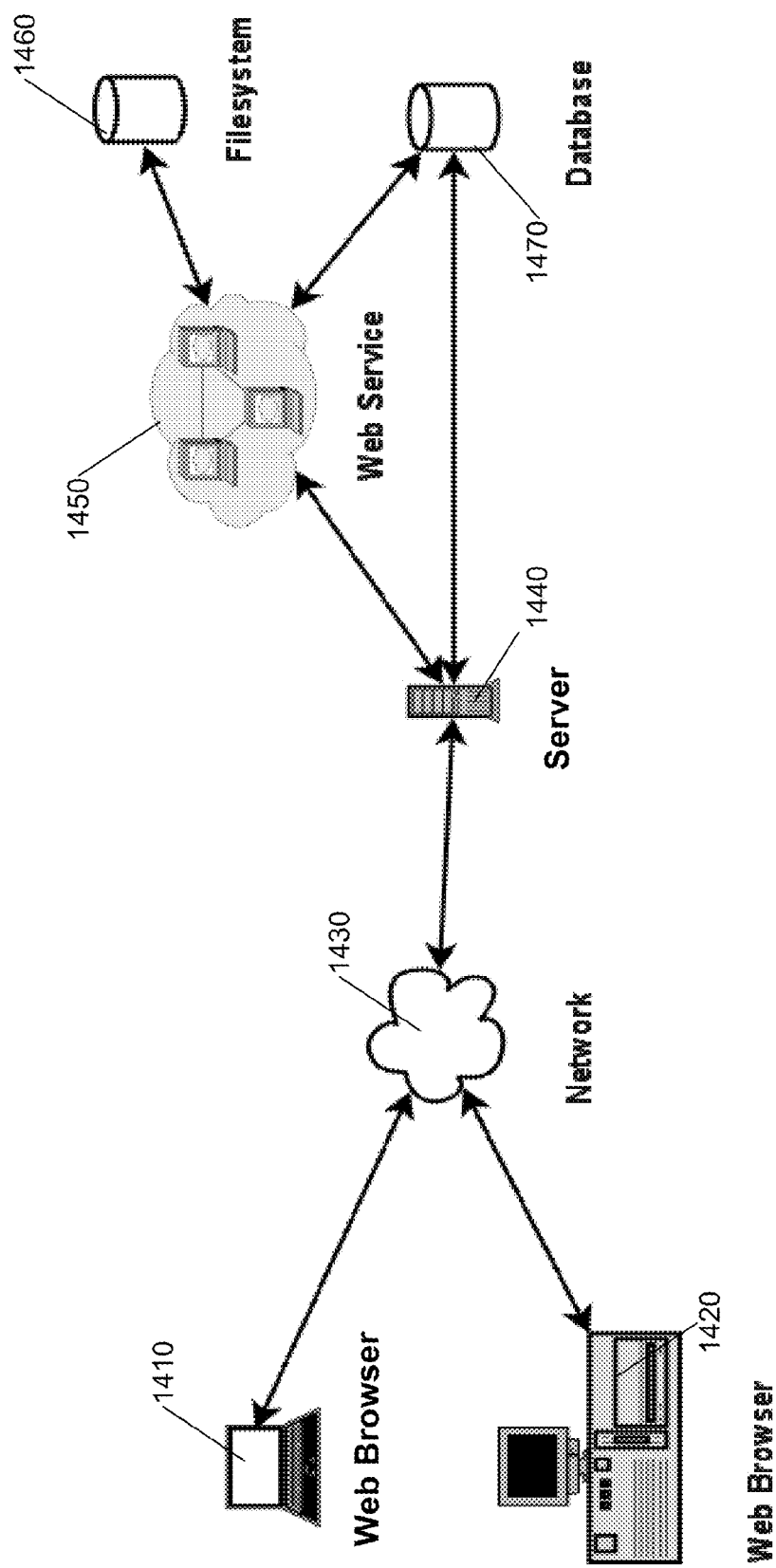
FIG. 14 illustrates an implementation of a planning web service according to an embodiment of the invention.

FIG. 14 illustrates an implementation of a planning web service according to an embodiment of the invention. FIG. 14 includes web browsers 1410 and 1420 that can connect through network 1430 to a server 1440. The server is connected to a web service 1450 (also identified as a planning web service), and a database 1470. In an embodiment, web service 1450 can be a distributed pool of planning web services, as will be discussed in more detail. Server 1440 can provide web browsers 1410 and 1420 access to web service 1450 and can also facilitate the loading of a plan from database to 1470 to web service 1450 as an in-memory object. Furthermore, web service 1450 is connected to a file system 1460, which is a collection of one or more files, and web service 1450 can export an in-memory object representing a plan to a file.

According to an embodiment of the invention, a server initially does not contain a planning web service. In the embodiment, web service 1450 (or a distributed pool of planning web services) is dynamically loaded onto a free server. One or more plans are then dynamically loaded onto web service 1450. As an example, a plan can be loaded from database 1470 to web service 1450. As another example, a plan can be loaded from file system 1460 to web service 1450. Once a plan is loaded on web service 1450, a user can interface with web service 1450 in order to make changes to the plan, through changing the planning data, in order to create an alternate scenario. The user can then interface with web service 1450 in order to generate a solution based on the alternative scenario.

In an embodiment, a distributed pool of planning web services can be used. According to the embodiment, two or more planning web services are run on two or more servers. In an embodiment, each planning web service can be run on its own server. However, in alternative embodiments, a server can support two, three, four, or any number of planning web services.

Figure 15:
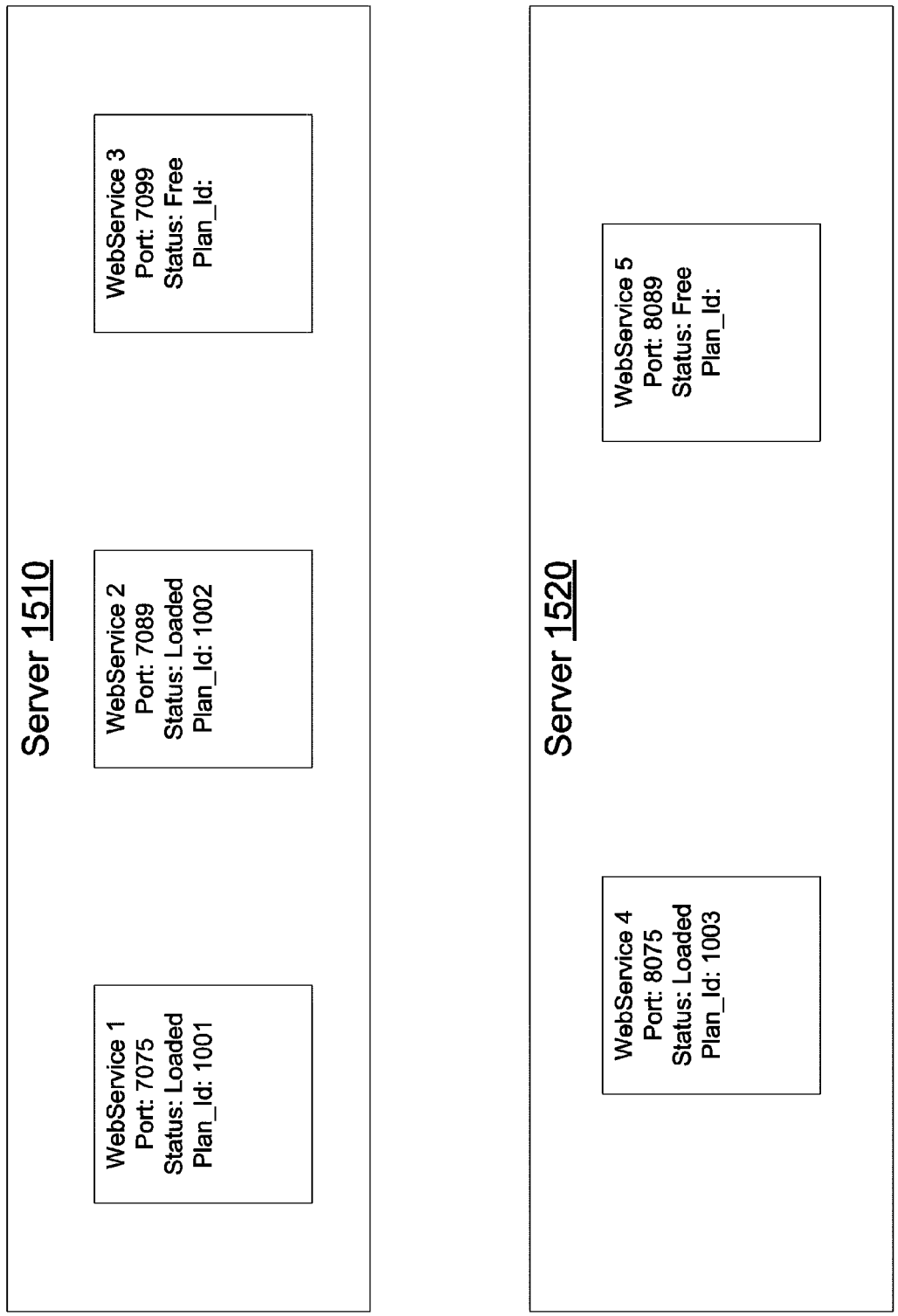
FIG. 15 illustrates a distributed pool of planning web services according to an embodiment of the invention.

FIG. 15 illustrates a distributed pool of planning web services according to an embodiment of the invention. The illustrated embodiment includes two servers, server 1510 and server 1520, with each server including one or more planning web services. However, one of ordinary skill in the art would readily appreciate that a distributed pool of planning web services can include any number of servers and still be within the scope of the invention.

Server 1510 includes three planning web services, WebService 1, WebService 2, and WebService 3, which can be dynamically loaded on server 1510. Likewise, server 1520 includes two planning web services, WebService 4 and WebService 5. However, a server can include any number of planning web services and still be within the scope of the invention. For example, in an embodiment where a server includes a single processor, a server can include a single planning web service. However, in an embodiment where a server includes multiple processors, a where a server includes a processor with multiple cores, a server can include multiple planning web services.

Each planning web service is associated with a different port of the server. For example, WebService 1 is associated with port 7075, WebService 2 is associated with port 7089, WebService 3 is associated with port 7099, WebService 4 is associated with port 8075, and WebService 5 is associated with port 8089. As described above, each web service is initially empty. In the illustrated embodiment, WebService 3 of server 1510, and WebService 5 of server 1520, are each empty, and thus, have a status of "Free." According to an embodiment, when a user wishes to load a plan onto a planning web service, the supply chain planning system looks for a free server and loads a plan on to a server. In the illustrated embodiment, WebService 1 and WebService 2 of server 1510, and WebService 4 of server 1520, are each associated with a plan, and thus, have a status of "Loaded." Furthermore, WebService 1, Web Service 2, and Web Service 4 each have a Plan_Id value, which identifies the associated plans as 1001, 1002, and 1003, respectively.

In an embodiment where each server can include a single planning web service, if a user wishes to load a second plan onto a planning web service, where a first plan has already been loaded, then the supply chain planning system can bypass all servers that are associated with a plan, can select a server that is not associated with a plan, and can load the plan onto the planning web service of the server. After a user is finished with a planning web service, the supply chain planning system can unload the plan from the planning web service, thus freeing up the server. In another embodiment, where each server can include multiple planning web services, if a user wishes to load a second plan onto a planning web service, where a first plan has already been loaded, the supply chain planning system initiates a second planning web service, and loads the second plan onto the second planning web service. The supply chain planning system can continue to initiate planning web services on a server, and loading plans on the initiated planning web services until the maximum number of planning web services on the server is reached. If the maximum number of planning web services is reached, and a user wishes to load an additional plan, the supply chain planning system can bypass the server with a maximum number of planning web services, can select a server that does not have a maximum number of planning web services, and can load the plan onto the planning web service of the server.

Figure 16:
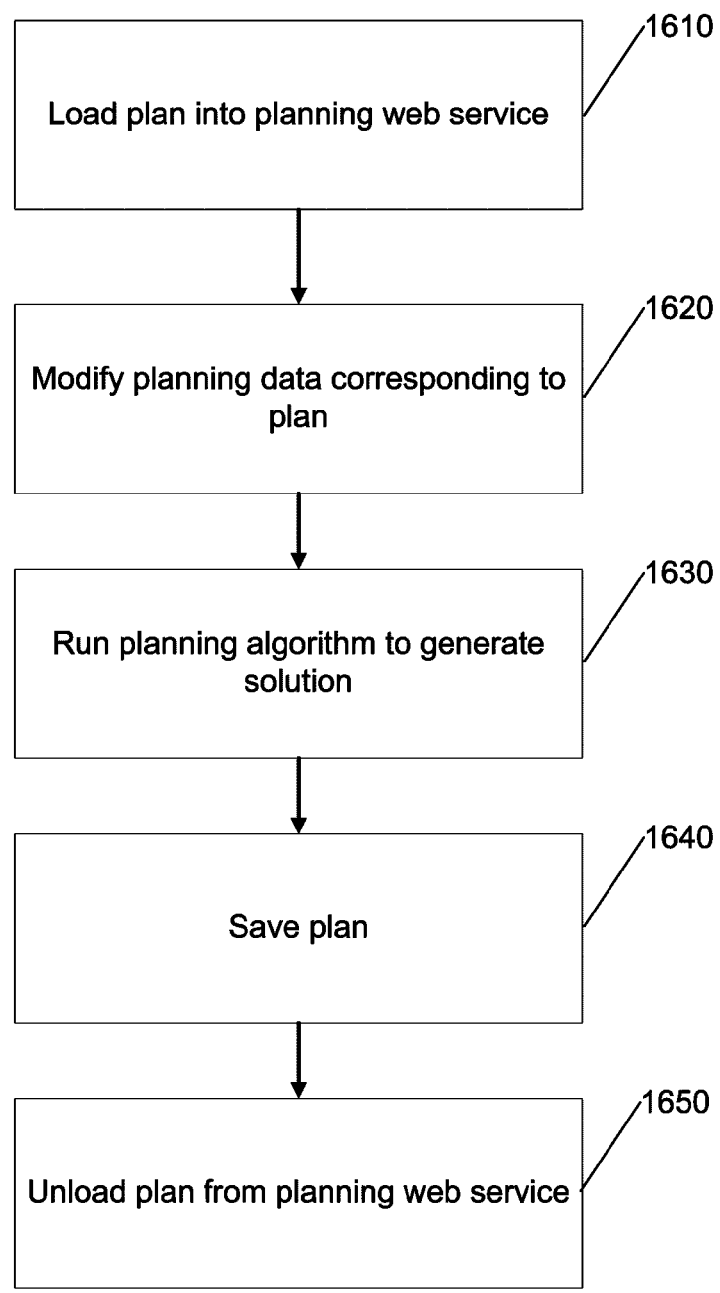
FIG. 16 illustrates a flow diagram of the functionality of the supply chain planning module utilizing a planning web service according to an embodiment of the invention.

FIG. 16 illustrates a flow diagram of the functionality of the supply chain planning module utilizing a planning web service according to an embodiment of the invention. At 1610, a plan is loaded into a planning web service. In an embodiment, the planning web service can be loaded on a server, and the plan may be loaded into the planning web service as an in-memory object. According to one embodiment, the plan is loaded from a database. According to another embodiment, the plan is loaded from a file. At 1620, planning data associated with the plan is modified. In an embodiment, the planning data associated with the plan is modified by modifying the in-memory object. At 1630, a planning algorithm is run in the planning web service on the modified data in order to generate a solution. At 1640, the plan is saved. In an embodiment, the plan is saved in a database. In another embodiment, the plan is saved in a file. At 1650, the plan is unloaded from the planning web service.

In an embodiment of the invention, real-time events can cause a change in an initial supply-chain plan to be required. For example, a key customer may modify their demands, an engineering change may result in a component becoming obsolete. A change in the initial plan can require modeling of various alternative scenarios based on an initial plan. Thus, there can be a need for a supply chain planning system to quickly create multiple copies of an initial plan and create alternate scenarios based on the copies of the initial plan.

Figure 17:
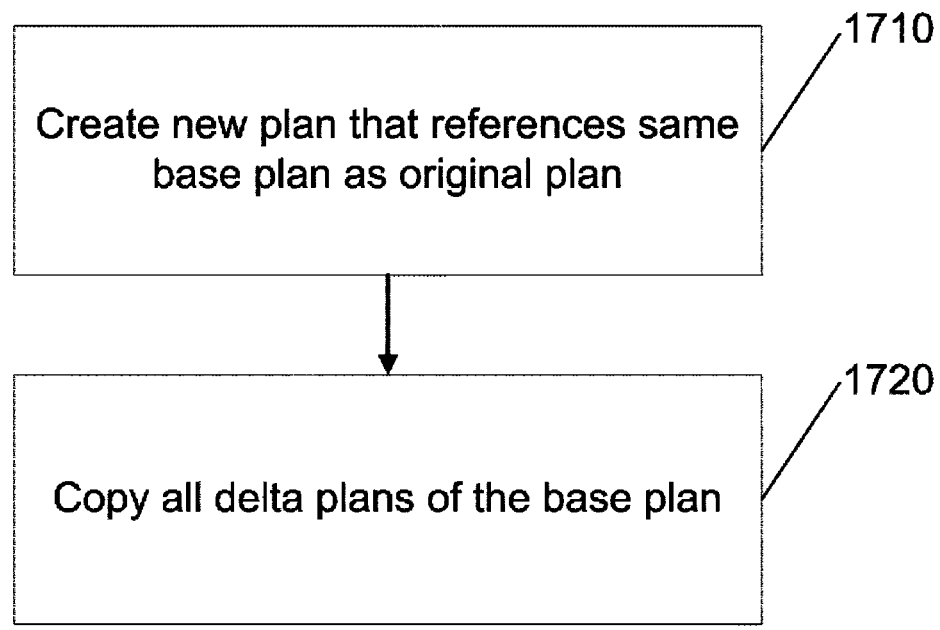
FIG. 17 illustrates a flow diagram of the functionality of the supply chain planning module when copying a plan according to an embodiment of the invention.

FIG. 17 illustrates a flow diagram of the functionality of the supply chain planning module when copying a plan according to an embodiment of the invention. In the embodiment, a plan is implemented using a base-plus-delta model described above. At 1710, a new plan is created that references a same base plan as an original plan. At 1720, all delta plans of the base plan are copied. According to an embodiment of the invention, copying all delta plans includes copying all records in the original plan that are different from the records in the corresponding base plan are copied. This is because these records represents delta plan records. According to the embodiment, the base plan records do not need to be copied due to the use of the base-plus-delta model. Instead the new plan merely references the same base plan that the original plan referenced. Thus, according to the embodiment, the copying of plans is significantly faster.

Figure 18:
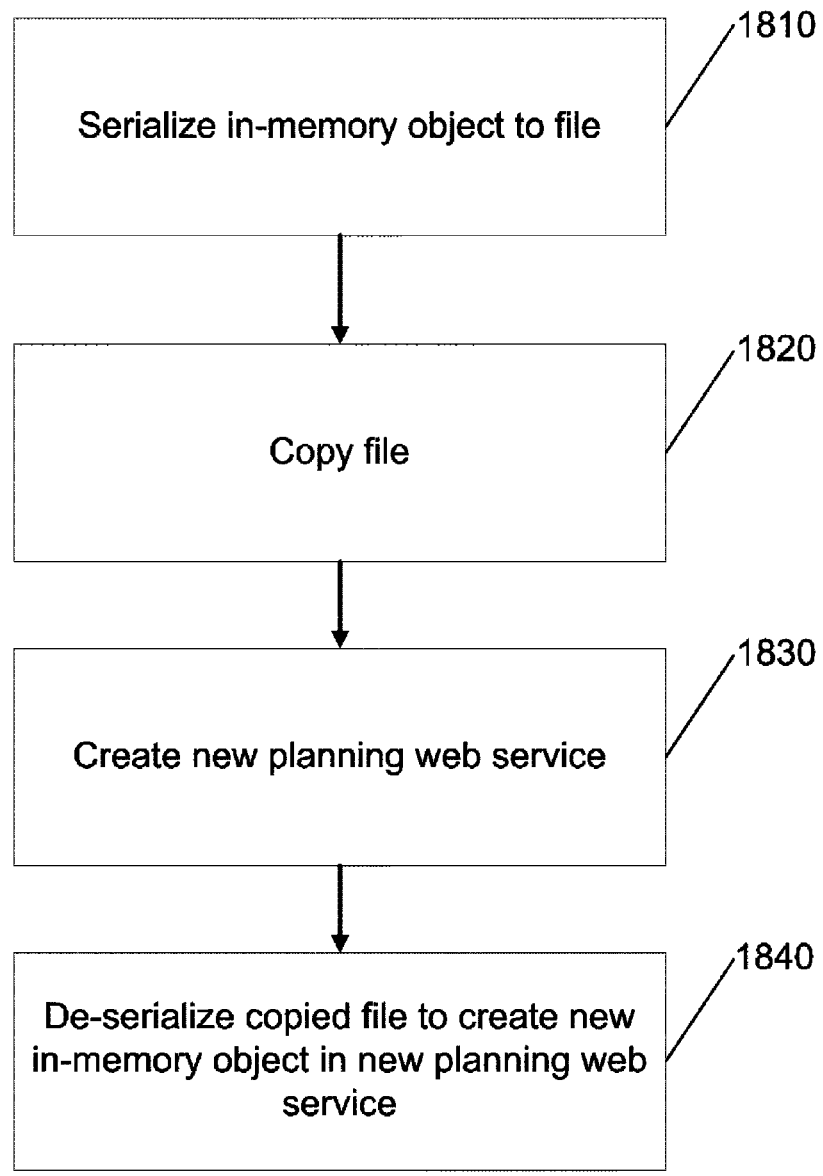
FIG. 18 illustrates a flow diagram of the functionality of the supply chain planning module when copying a plan according to another embodiment of the invention.

FIG. 18 illustrates a flow diagram of the functionality of the supply chain planning module when copying a plan according to another embodiment of the invention. In the embodiment, a plan is implemented as an in-memory object which is loaded into a planning web service. At 1810, an in-memory object is serialized into a file. In the embodiment, the in-memory object represents a plan. At 1820, the file is copied. At 1830, a new planning web service is created. In an embodiment, the new planning web service is loaded onto a server. At 1840, the copied file is de-serialized to create a new in-memory object for the new planning web service.

A user can make changes to planning data in a database that corresponds to a plan, while another user loads the same plan into an in-memory object in a planning web service. As previously described a database can provide multi-user transactions, auditing, reporting, and querying capabilities, where planning data is stored in tables and rows, and is relational. However, a planning algorithm does not work on database tables, but instead works on an in-memory object. Thus, in a conventional supply chain planning system, the system must reload the database and convert the changed planning data into an updated in-memory object.

In accordance with an embodiment of the invention, a supply chain planning system can propagate user changes to planning data in a database to a planning web service to directly modify the in-memory object in the planning web service. Thus, in the embodiment, when a user makes changes to planning data in a database, a planning web service does not have to reload the planning data and recreate the in-memory object.

Figure 19:
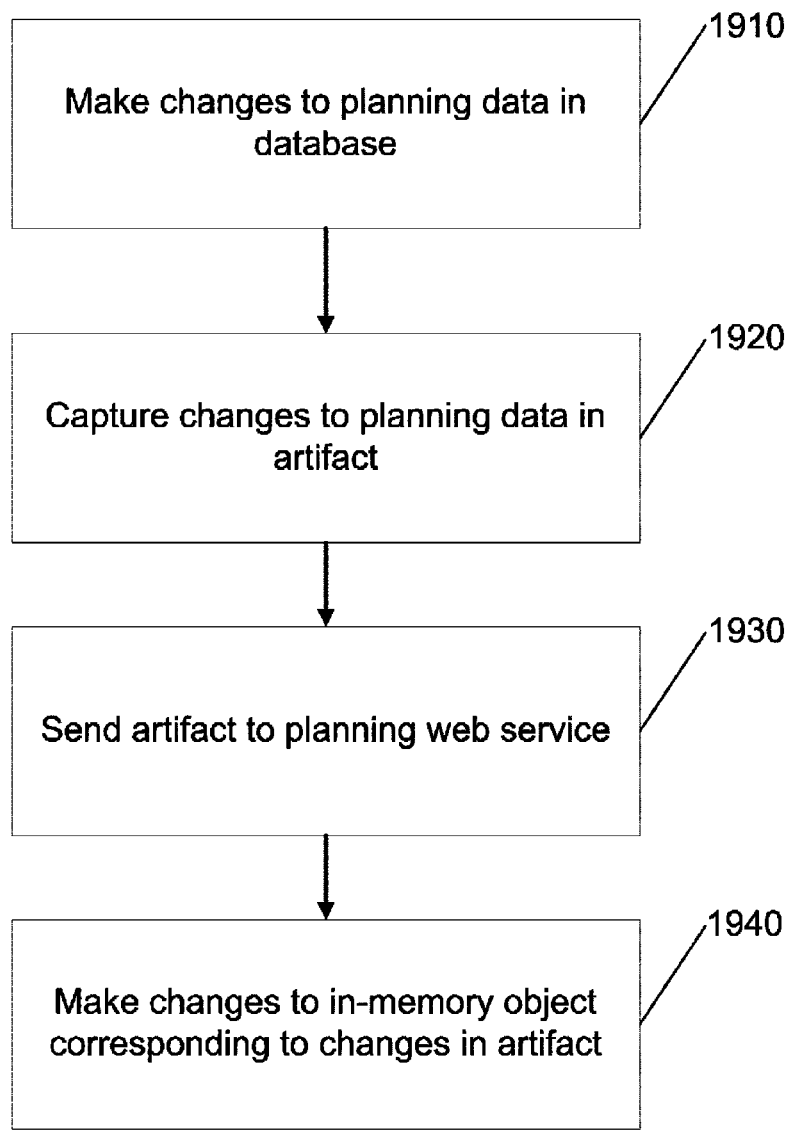
FIG. 19 illustrates a flow diagram of the functionality of the supply chain planning module when propagating changes to an in-memory object in a planning web service according to an embodiment of the invention.

FIG. 19 illustrates a flow diagram of the functionality of the supply chain planning module when propagating changes to an in-memory object in a planning web service according to an embodiment of the invention. At 1910, changes to planning data are made in a database. At 1920, the changes are captured in an artifact. In an embodiment of the invention, the artifact is an XML document. However, in other embodiments of the invention, the artifact can be a text document, a string, or an in-memory object. At 1930, the artifact is sent to a planning web service. At 1940, changes are made to an in-memory object that correspond to the changes in the artifact. In the embodiment, the planning data in the database and the in-memory object in the planning web service each correspond to the same plan.

Figure 20:
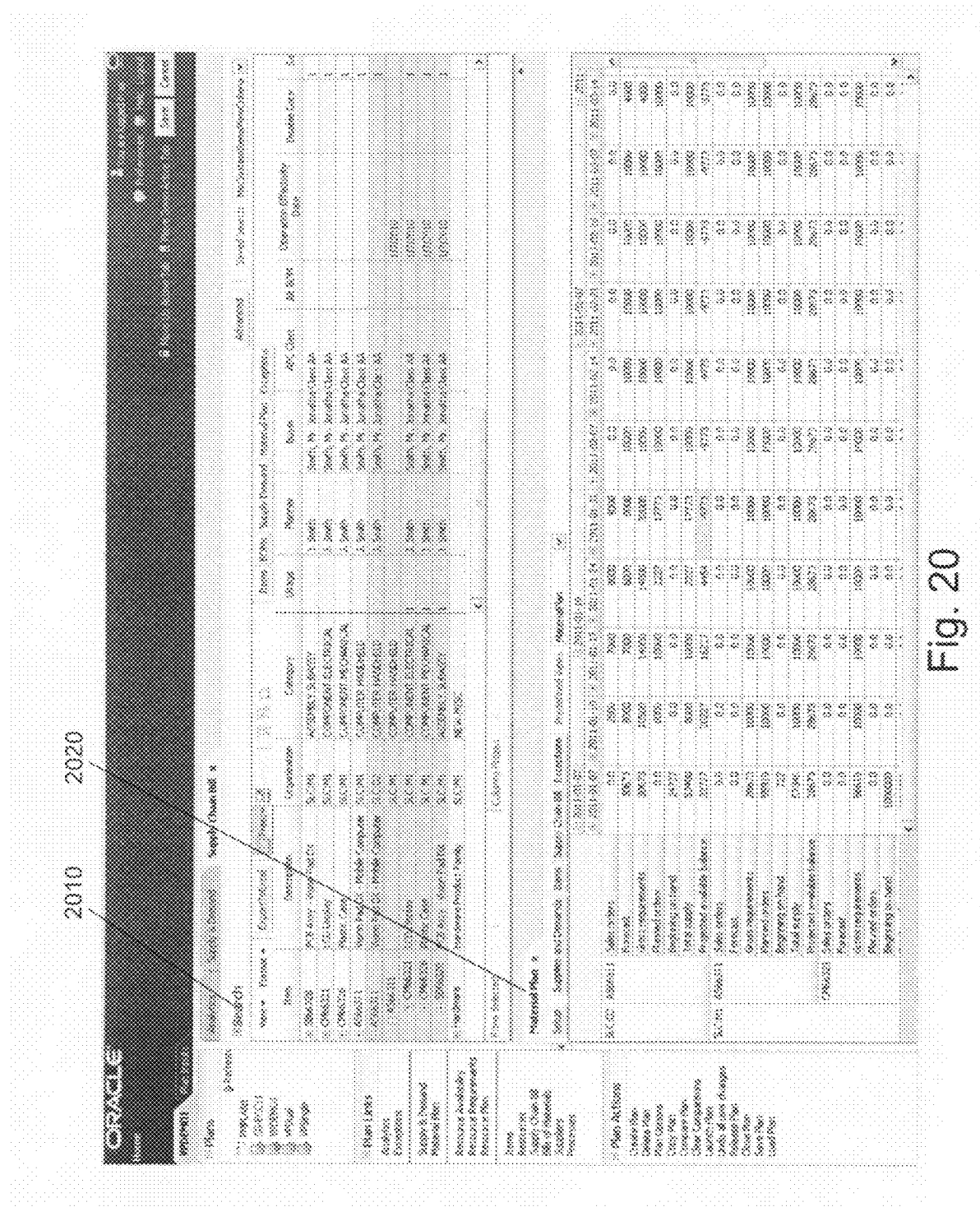
FIG. 20 illustrates a user interface of an interactive supply chain planning system according to an embodiment of the invention.

FIG. 20 illustrates a user interface of an interactive supply chain planning system according to an embodiment of the invention. The user interface includes search view 2010. Search view 2010 provides a user an overview of one or more plans stored in the interactive supply chain planning system. The user interface also include detailed view 2020. Detailed view 2020 provides a user a detailed view of a plan that a user selects in search view 2010.

Figure 21:
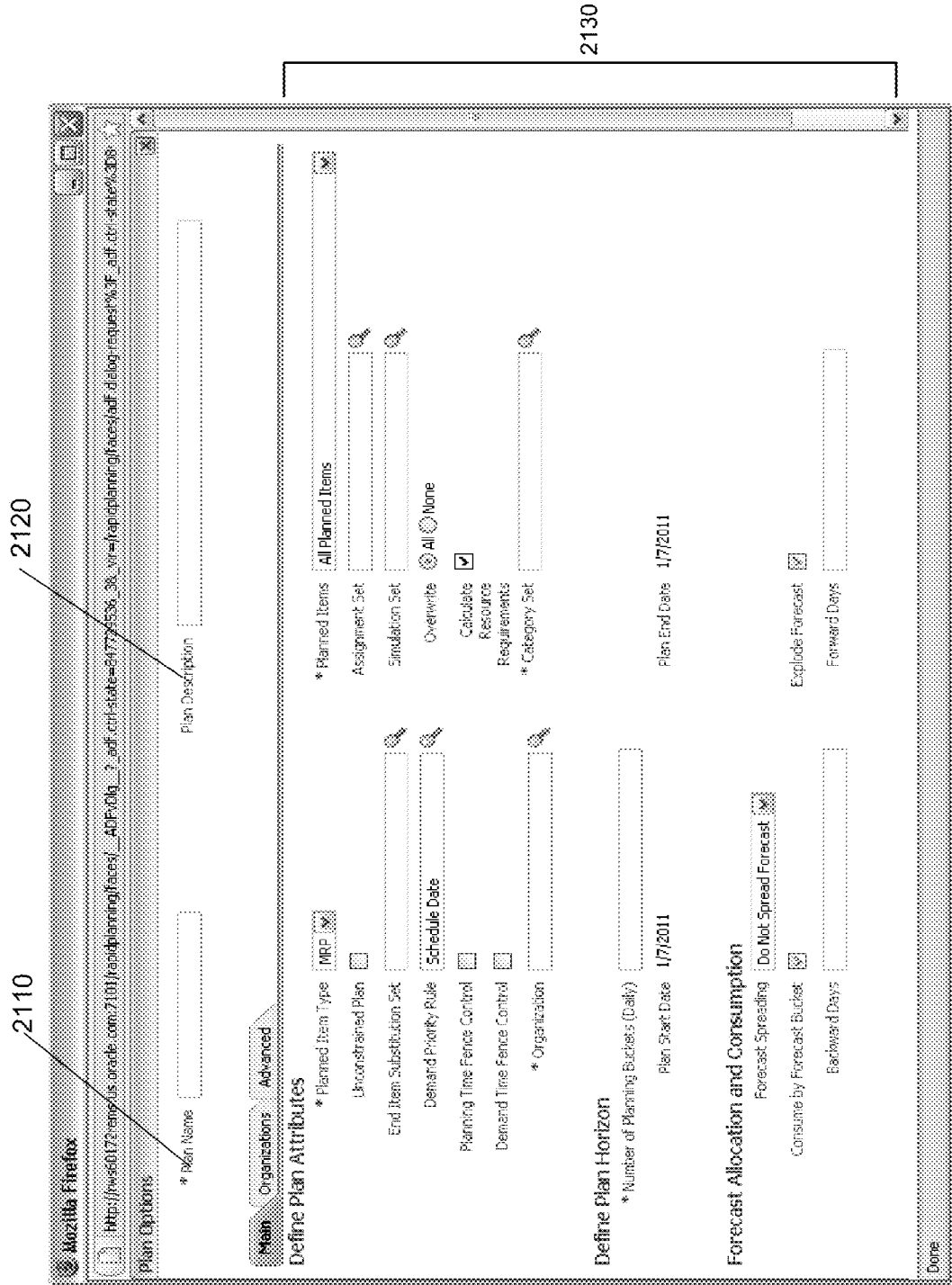
FIG. 21 illustrates another user interface of an interactive supply chain planning system according to an embodiment of the invention.

FIG. 21 illustrates another user interface of an interactive supply chain planning system according to an embodiment of the invention. The user interface allows a user to create a new plan in the interactive supply chain planning system. The user interface includes plan name field 2110 and plan description field 2120 where a user can enter a plan name and a plan description for the new plan. The user interface also includes define plan attributes window 2130. In define plan attributes window 2130, a user can define the various attributes that make up a plan.

Thus, according to an embodiment of the invention, a new computer-readable medium, computer-implemented method, and system are provided which can utilize a unique base-plus-delta data model or a planning web service for interactive planning, or a combination of the features. Such a computer-readable medium, computer-implemented method, and system can have the benefits of transactional, multi-user, and auditing capabilities of a database, and the speed of an in-memory planning engine.

The features, structures, or characteristics of the invention described throughout this specification may be combined in any suitable manner in one or more embodiments. For example, the usage of "an embodiment," "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "an embodiment," "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to create a plan, the creating comprising:

creating supply chain planning data that is stored within a database;

creating a base supply chain plan stored within the database using the supply chain planning data, wherein the base supply chain plan comprises an independent supply chain plan that includes a set of supply chain planning data for the base supply chain plan, wherein the base supply chain plan comprises a first collection of one or more records in one or more tables of the database, and wherein the one or more records of the first collection are identified as belonging to the base supply chain plan;

making changes to the base supply chain plan based on an alternate supply chain scenario;

saving the changes to the base supply chain plan as a delta supply chain plan stored within the database, wherein the delta supply chain plan comprises a dependent supply chain plan that includes supply chain planning data associated with changes to the base supply chain plan, wherein, for other supply chain planning data of the delta supply chain plan, the delta supply chain plan refers to the supply chain planning data of the base supply chain plan, wherein the delta supply chain plan comprises a second collection of one or more records in one or more tables of the database, and wherein the one or more records of the second collection are identified as belonging to the delta supply chain plan;

tracking the changes to the base supply chain plan by creating, for each change, a change record within a user actions table stored within the database, wherein each change record is separate from the one or more records of the delta supply chain plan;

wherein each change record comprises a unique identity, a plan identity that identifies the delta supply chain plan that the change is associated with, a base plan identity that identifies the base supply chain plan that the delta supply chain plan is associated with, and the change;

loading the delta supply chain plan into an object residing in a memory;

applying a planning algorithm to the object residing in the memory that comprises the delta supply chain plan to generate a new supply chain solution;

creating a new delta supply chain plan that refers to the supply chain planning data of the base supply chain plan, wherein the new delta chain plan further comprises a third collection of one or more records in one or more tables of the database, and wherein the one or more records of the third collection are identified as belonging to the new delta supply chain plan; and copying the supply chain planning data of the delta supply chain plan into the new delta supply chain plan.

2. The non-transitory computer-readable medium of claim 1, wherein creating the base supply chain plan comprises creating records in one or more tables of the database and identifying the records as belonging to the base supply chain plan, wherein making changes to the base supply chain plan comprises inserting one or more records of one or more tables of the database, deleting one or more records of one or more tables of the database, or updating one or more values of one or more records of one or more tables of the database, and wherein saving the changes to the base supply chain plan as the delta supply chain plan comprises creating records in one or more tables of the database, identifying the records as belonging to the delta supply chain plan, and referencing the base supply chain plan that the delta supply chain plan depends upon.

3. The non-transitory computer-readable medium of claim 1, wherein the base supply chain plan and the delta supply chain plan each comprise a computer file.

4. A computer-implemented method, comprising:

creating, by a processor, supply chain planning data that is stored within a database;

creating, by the processor, a base supply chain plan stored within the database using the supply chain planning data, wherein the base supply chain plan comprises an independent supply chain plan that includes a set of supply chain planning data for the base supply chain plan, wherein the base supply chain plan comprises a first collection of one or more records in one or more tables of the database, and wherein the one or more records of the first collection are identified as belonging to the base supply chain plan;

making changes, by the processor, to the base supply chain plan based on an alternate supply chain scenario;

saving, by the processor, the changes to the base supply chain plan as a delta supply chain plan stored within the database, wherein the delta supply chain plan comprises a dependent supply chain plan that includes supply chain planning data associated with changes to the base supply chain plan, wherein, for other supply chain planning data of the delta supply chain plan, the delta supply chain plan refers to the supply chain planning data of the base supply chain plan, wherein the delta supply chain plan comprises a second collection of one or more records in one or more tables of the database, and wherein the one or more records of the second collection are identified as belonging to the delta supply chain plan;

tracking the changes to the base supply chain plan by creating, for each change, a change record within a user actions table stored within the database wherein each change record is separate from the one or more records of the delta supply chain plan;

wherein each change record comprises a unique identity, a plan identity that identifies the delta supply chain plan that the change is associated with, a base plan identity that identifies the base supply chain plan that the delta supply chain plan is associated with, and the change;

loading, by the processor, the delta supply chain plan into an object residing in a memory;

applying, by the processor, a planning algorithm to the object residing in the memory that comprises the delta supply chain plan to generate a new supply chain solution;

creating, by the processor, a new delta supply chain plan that refers to the supply chain planning data of the base supply chain plan, wherein the new delta chain plan further comprises a third collection of one or more records in one or more tables of the database, and wherein the one or more records of the third collection are identified as belonging to the new delta supply chain plan; and copying, by the processor, the supply chain planning data of the delta supply chain plan into the new delta supply chain plan.

5. The computer-implemented method of claim 4, wherein creating the base supply chain plan comprises creating records in one or more tables of the database and identifying the records as belonging to the base supply chain plan, wherein making changes to the base supply chain plan comprises inserting one or more records of one or more tables of the database, deleting one or more records of one or more tables of the database, or updating one or more values of one or more records of one or more tables of the database, and wherein saving the changes to the base supply chain plan as the delta supply chain plan comprises creating records in one or more tables of the database, identifying the records as belonging to the delta supply chain plan, and referencing the base supply chain plan that the delta supply chain plan depends upon.

6. The computer-implemented method of claim 4, wherein the base supply chain plan and the delta supply chain plan each comprise a computer file.

7. The computer-implemented method of claim 4, wherein the set of supply chain planning data for the base supply chain plan is a complete set of supply chain planning data.

8. The computer-implemented method of claim 4, wherein the dependent supply chain plan only includes supply chain planning data associated with changes to the base supply chain plan.

9. A supply chain planning system, comprising:
a memory configured to store instructions;
a processor configured to execute the instructions stored on the memory; and
a database configured to store data,
wherein the processor is further configured, when executing the instructions stored on the memory, to:
create supply chain planning data that is stored within the database;
create a base supply chain plan stored within the database using the supply chain planning data, wherein the base supply chain plan comprises an independent supply chain plan that includes a set of supply chain planning data for the base supply chain plan, wherein the base supply chain plan comprises a first collection of one or more records in one or more tables of the database, and wherein the one or more records of the first collection are identified as belonging to the base supply chain plan;
make changes to the base supply chain plan based on an alternate supply chain scenario;
save the changes to the base supply chain plan as a delta supply chain plan stored within the database, wherein the delta supply chain plan comprises a dependent supply chain plan that includes supply chain planning data associated with changes to the base supply chain plan, wherein, for other supply chain planning data of the delta supply chain plan, the delta supply chain plan refers to the supply chain planning data of the base supply chain plan, wherein the delta supply chain plan comprises a second collection of one or more records in one or more tables of the database, and wherein the one or more records of the second collection are identified as belonging to the delta supply chain plan;
track the changes to the base supply chain plan by creating, for each change, a change record within a user actions table stored within the database, wherein each change record is separate from the one or more records of the delta supply chain plan;
wherein each change record comprises a unique identity, a plan identity that identifies the delta supply chain plan that the change is associated with, a base plan identity that identifies the base supply chain plan that the delta supply chain plan is associated with, and the change;
load the delta supply chain plan into an object residing in the memory;
apply a planning algorithm to the object residing in the memory that comprises the delta supply chain plan to generate a new supply chain solution;
create a new delta supply chain plan that refers to the supply chain planning data of the base supply chain plan, wherein the new delta chain plan further comprises a third collection of one or more records in one or more tables of the database, and wherein the one or more records of the third collection are identified as belonging to the new delta supply chain plan; and
copy the supply chain planning data of the delta supply chain plan into the new delta supply chain plan.

10. The supply chain planning system of claim 9, wherein the processor is further configured, when executing the instructions stored on the memory, to:
create records in one or more tables of the database and identify the records as belonging to the base supply chain plan;
insert one or more records of one or more tables of the database, delete one or more records of one or more tables of the database, or update one or more values of one or more records of one or more tables of the database; and
create records in one or more tables of the database, identify the records as belonging to the delta supply chain plan, and reference the base supply chain plan that the delta supply chain plan depends upon.

11. The supply chain planning system of claim 9, wherein the base supply chain plan and the delta supply chain plan each comprise a computer file.

12. The supply chain planning system of claim 9, wherein the set of supply chain planning data for the base supply chain plan is a complete set of supply chain planning data.

13. The supply chain planning system of claim 9, wherein the dependent supply chain plan only includes supply chain planning data associated with changes to the base supply chain plan.

* * * * *

UNITED STATES PATENT AND TRADEMARK OFFICE
CERTIFICATE OF CORRECTION

PATENT NO. : 9,740,994 B2
APPLICATION NO. : 12/751509
DATED : August 22, 2017
INVENTOR(S) : Abraham et al.

It is certified that error appears in the above-identified patent and that said Letters Patent is hereby corrected as shown below:

On page 2, Column 1, under Other Publications, Line 14, delete "Sceince" and insert -- Science --, therefor.

In Column 11, Line 25, delete "preexisting" and insert -- pre-existing --, therefor.

Signed and Sealed this
Twenty-second Day of May, 2018

Andrei Iancu
*Director of the United States Patent and Trademark Office*